United States Patent [19]

Solomon et al.

[11] Patent Number: 5,604,792
[45] Date of Patent: * Feb. 18, 1997

[54] CALL SCREENING METHOD

[75] Inventors: Merrill Solomon, Washington, D.C.; John Kimball, Germantown; Dana L. Goldstein, Rockville, both of Md.

[73] Assignee: The Telephone Connection, Inc., Rockville, Md.

[ * ] Notice: The term of this patent shall not extend beyond the expiration date of Pat. No. 5,361,295.

[21] Appl. No.: 478,575

[22] Filed: Jun. 7, 1995

Related U.S. Application Data

[62] Division of Ser. No. 265,865, Jun. 27, 1994, which is a division of Ser. No. 774,963, Oct. 11, 1991, Pat. No. 5,361,295, which is a continuation-in-part of Ser. No. 448,110, Dec. 12, 1989, Pat. No. 5,058,152.

[51] Int. Cl.$^6$ .............................. H04M 1/64; H04M 1/66; H04M 3/42
[52] U.S. Cl. ............................. 379/67; 379/142; 379/196; 379/211
[58] Field of Search ................................ 379/88, 67, 89, 379/82, 84, 230, 233, 188, 196, 199, 214, 142, 211, 213

[56] References Cited

U.S. PATENT DOCUMENTS

| | | | |
|---|---|---|---|
| 2,957,047 | 10/1960 | Wennemer | 379/211 |
| 3,410,598 | 10/1965 | Ballin et al. | 379/74 |
| 3,614,328 | 10/1971 | McNaughton et al. | 379/211 X |
| 3,626,109 | 12/1971 | Bartlett et al. | 379/197 |
| 3,704,346 | 11/1972 | Smith et al. | 379/157 |
| 3,959,600 | 5/1976 | Sousa | 379/157 |
| 4,266,098 | 5/1981 | Novak | 379/77 |

(List continued on next page.)

FOREIGN PATENT DOCUMENTS

| | | | |
|---|---|---|---|
| 3027176 | 2/1982 | Germany . | |
| 56-89161 | 7/1981 | Japan | 379/199 |
| 56-156058 | 12/1981 | Japan | 379/79 |
| 57-24153 | 2/1982 | Japan | 379/199 |
| 58-96447 | 6/1983 | Japan | 379/211 |
| 59-52954 | 3/1984 | Japan | 379/211 |
| 61-142848 | 6/1986 | Japan | 379/211 |
| 61-150557 | 7/1986 | Japan | 379/212 |

OTHER PUBLICATIONS

Advertisement by Cellular One—Accessline Packages.
Electronics Magazine (USA), vol. 51, No. 3, Issued Feb. 2, 1978, "Flexible Voice Response Unit Will Have Many Messages For Telephone Subscribers", pp. 6E, 8E, and 10E.
Bell Communications Research Exchange, vol. 3, Issue 3, May/Jun. 1987, Intelligent Network/2: A flexible framework for exchange services, Patrick Miller, pp. 9–13.

*Primary Examiner*—Thomas W. Brown
*Attorney, Agent, or Firm*—Keck, Mahin & Cate

[57] ABSTRACT

An anonymous interactive telephone system for connecting a caller to a subscriber without divulging the identity or telephone number of either unless voluntarily revealed. The subscriber publishes an advertisement together with a telephone number of a system controller station. A subscriber reference number is embedded within the telephone number of the system controller station as a DID number. The subscriber also supplies information to the system controller station related to time periods during which calls may be directly forwarded to the subscriber or intercepted by the system controller. The system controller repeatedly accesses the central switching station or local switching station of the public telephone company to activate and de-activate the call forwarding function of the switching station for controlling call forwarding to the subscriber on the basis of the subscriber's published DID number. In a second embodiment, a service for providing call screening for persons having unpublished telephone numbers is provided. In a third embodiment, a caller ID blocking service is provided. In a fourth embodiment, methods are provided by which telephone company switches and associated network components implement the anonymous interactive telephone system and other functions. In a fifth embodiment, a call screening system having answer machine style interfacing is provided.

1 Claim, 37 Drawing Sheets

U.S. PATENT DOCUMENTS

| | | | |
|---|---|---|---|
| 4,277,649 | 7/1981 | Sheinbein | 379/201 |
| 4,313,035 | 1/1982 | Jordan et al. | 379/207 |
| 4,371,752 | 2/1983 | Matthews et al. | 379/89 |
| 4,577,062 | 3/1986 | Hilleary et al. | 379/88 |
| 4,611,094 | 9/1986 | Asmuth et al. | 379/89 |
| 4,629,831 | 12/1986 | Curtin et al. | 379/213 |
| 4,634,811 | 1/1987 | Curtin et al. | 379/211 |
| 4,696,028 | 9/1987 | Morganstein et al. | 379/88 |
| 4,759,056 | 7/1988 | Akiyama | 379/197 |
| 4,785,473 | 11/1988 | Pfeiffer et al. | 379/89 |
| 4,847,890 | 7/1989 | Solomon | 379/67 |
| 4,852,149 | 7/1989 | Zwick et al. | 379/67 |
| 4,893,335 | 1/1990 | Fuller et al. | 379/200 |
| 4,899,358 | 2/1990 | Blakley | 379/67 |
| 4,932,042 | 6/1990 | Baral et al. | 379/67 |
| 4,942,598 | 7/1990 | Davis | 379/57 |
| 4,994,797 | 2/1991 | Breeden | 340/825.44 |
| 5,029,196 | 7/1991 | Morganstein | 379/67 |
| 5,058,152 | 10/1991 | Solomon et al. | 379/67 |
| 5,060,255 | 10/1991 | Brown | 379/67 |
| 5,099,509 | 3/1992 | Morganstein et al. | 379/84 |
| 5,199,062 | 3/1993 | Von Meister et al. | 379/67 |

CALL SCREENING METHOD

This application is a divisional of U.S. Patent application Ser. No. 08/265,865, filed Jun. 27, 1994, which is a divisional of U.S. Patent application Ser. No. 07/774,963, filed Oct. 11, 1991, now U.S. Pat. No. 5,361,295, which is a continuation-in-part of U.S. patent application Ser. No. 07/448,110 filed on Dec. 12, 1989, now U.S. Pat. No. 5,058,152, and is also related to U.S. Pat. Nos. 4,878,239 and 4,874,890.

BACKGROUND OF THE INVENTION

The aforementioned '890 patent introduces and discloses a telephone system "personals" service and classified advertising service whereby ads are placed and published as previously known. A person reading an ad, the caller, and interested in establishing a personal relationship with the person who placed the ad, or purchasing an item for sale from that person, the subscriber, calls a telephone number published in the "personals" column, or in the case of a classified advertisement, The classified section. The number called is that of a central computer based system, and the caller is prompted to enter the subscriber's reference number (SRN) furnished in the ad and unique to the subscriber. The computer then uses the subscriber reference number as an index to locate the subscriber's telephone number, and automatically connects the caller to the subscriber. Only the computer is aware of the identity of the subscriber and the subscriber's telephone number, and hence the parties can communicate with one another while being mutually anonymous for as long as they desire.

The full text and teachings of the aforementioned patents are incorporated herein by reference.

The aforementioned '239 patent discloses certain cost-saving refinements made to the basic system first disclosed in the '890 patent, using available features of the public telephone company (in particular, a feature of a service sometimes called the "Centrex" telephone service) to connect a caller to a subscriber. Briefly, the caller is placed on hold at the telephone company's central office switching equipment and, concurrently, the subscriber's telephone number is located in the interactive system's memory. The subscriber is then called and also put on hold at the central office switching equipment. Finally, by hook flashing or some other means, the interactive system makes a connection between the caller and the subscriber at the telephone company's central office switching equipment, and disconnects the system from the line that originally was occupied by the caller, thus making the line available for the next incoming call. Utilizing this technique, the total number of lines required by the interactive system to provide adequate service to all callers and subscribers is minimized, for the system needs only enough lines to simultaneously process a peak number of calls that are expected at the same time, without having to consider the unknown and uncontrollable length of time that a caller and a subscriber may want to talk to one another.

The co-pending patent application discloses even further refinements to the system disclosed in the '890 and '239 patents. Specifically, this related application discloses the use of Direct Inward Dialing (DID) services to expedite anonymous connection. This prior application also discloses other aspects, such as a method and a system for enabling limited and automated contact with persons having unpublished telephone numbers, such as and for example, to enable facilitated and automated contact with individuals who do not wish that their telephone numbers be published and would like to screen such phone calls, and with groups such as physicians "on-call".

Another variation on this method utilizes a feature sometimes called auto three-way conference. After the caller is put on hold at the telephone company central office, the interactive system looks up the subscriber's telephone number and then calls the subscriber. The caller, subscriber and interactive system are automatically connected. The interactive system then hangs up.

While the '890 and '239 patents provide many features never before available in a classified advertisement system, and while the parent patent application has improved the efficiency of such a system, there is still a need to simplify the system to minimize unnecessary system interaction and to speed the procedure of anonymous connection.

SUMMARY OF THE INVENTION

The present invention relates to a further refinement of the interactive telephone system in which mutually anonymous parties may conduct telephone communication with each other, without delay, and with minimal intervening steps, and maintain such anonymous communication for as long as they desire. In other embodiments, the present invention relates to an interactive telephone system of similar function, but wherein contact is made possible without the need to divulge the telephone number of the person to whom a call is placed or the telephone number of the person originating the call.

Specifically, the present invention, in a first embodiment, is directed to a modification of the basic system first disclosed in the '890 patent. That is, the present invention takes advantage and use of the call forwarding feature of a service of the public telephone facilities, one of many services available as part of a special service package sometimes referred to as "Centrex". Call forwarding may also be purchased as a feature separate from Centrex services.

The call forwarding feature of the public telephone service is activated and de-activated by the system of the present invention for each subscriber. In this manner, calls placed by callers to a particular subscriber, during times when that particular subscriber has informed the system that he/she wishes to receive calls, are forwarded directly by the public telephone system to the particular subscriber. As a result, the system need not become involved in the processing of these calls. On the other hand, during times when the subscriber informs the system that he/she will not be available, or otherwise desires the system to intervene, calls from callers to that particular subscriber are directed to the system since the call forwarding feature at the public telephone central switching office will be de-activated for that particular subscriber.

A primary object of the present invention is to minimize processing of the system controller and to avoid the maintenance of static connections between callers and subscribers.

Other aspects disclosed in the prior related patents and application may also be used in combination with the present invention. In particular, the DID feature and message recording capabilities, for example, are envisioned to be used in accordance with the present invention. Additionally, the unpublished telephone number service disclosed in the aforementioned pending application is refined according to a second embodiment of this invention. A caller ID blocking service is also disclosed pursuant to a third embodiment.

Furthermore, in accordance with a fourth embodiment, various configurations are disclosed in which telephone company switching equipment is used to perform the anonymous telephone interaction system.

In a fifth embodiment, four methods for implementing call screening with an answer machine style interface in a voice mail type of system are disclosed.

In addition, a privacy hours function is provided to allow subscribers to program a block of time during which calls are to be intercepted and not directed to the subscriber.

The above and other objects and advantages will become more readily apparent when reference is made to the following description taken in conjunction with the accompanying drawings.

DETAILED DESCRIPTION OF THE DRAWINGS

For purposes of disclosure, the present invention will be described, in one embodiment, as an interactive telephone system of the "personals" or classified advertisement services type. It should be understood, however, that the system finds use in other advertising environments as well as other interactive telephone systems such as a call screening service.

Figure 1:
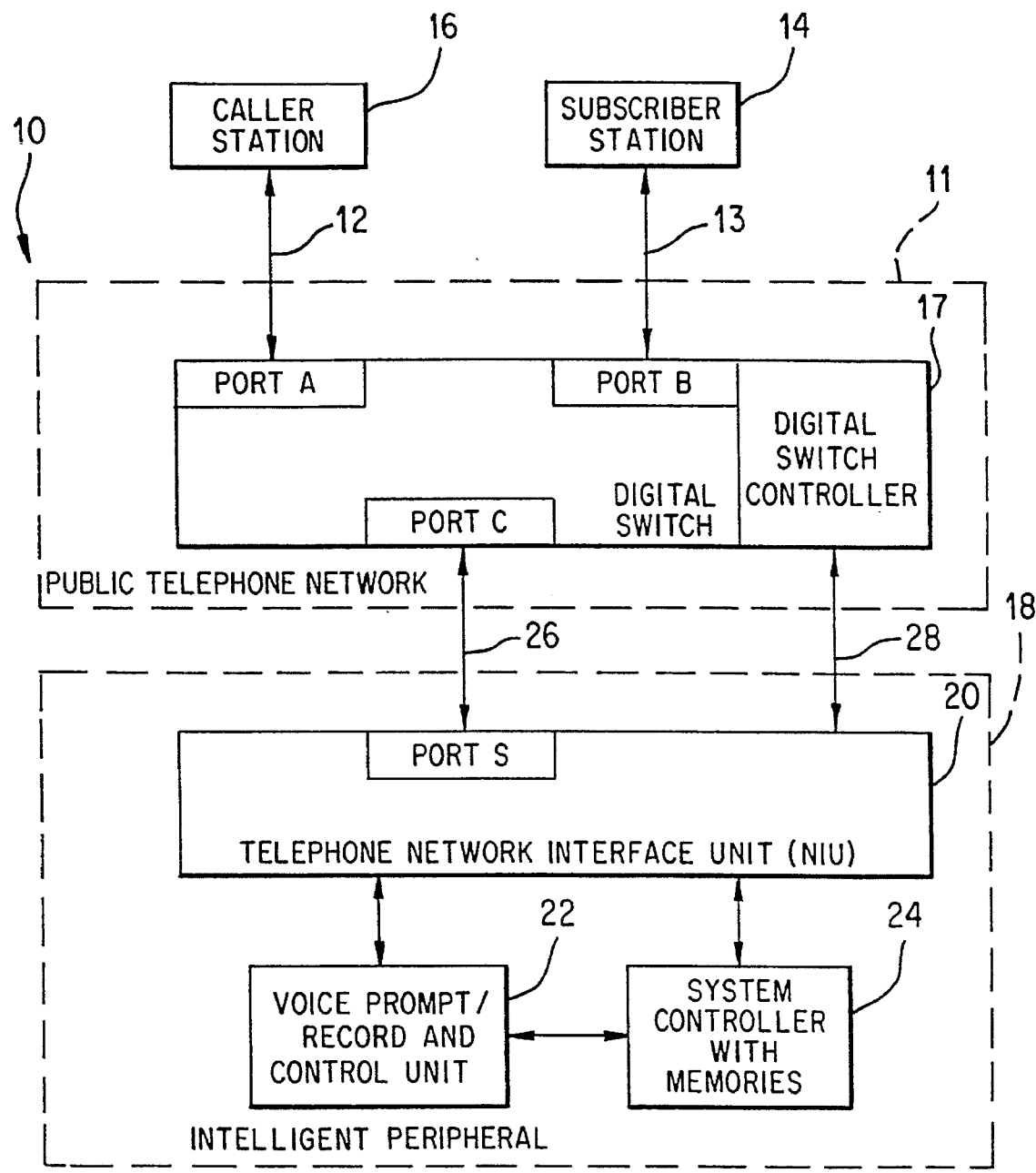
FIG. 1 is a block diagram illustrating the anonymous interactive telephone system according to the present invention.

Referring first to FIG. 1, the anonymous interactive telephone system is generally shown at 10. A detailed description of the basic operation of this system is not made here as such a description may be found in any of the aforementioned patents. The components of the invention shown in FIG. 1 are similar to those shown in the Figures of the predecessor patents, but are enclosed in blocks according to current telephone network nomenclature. Generally, the interactive telephone system involves the inter-linking through the public telephone service (enclosed by dotted lines and referred to by reference number 11) of a subscriber to the "personals" or classified advertisement service and an interested party (the caller). The subscriber has a telephone at a subscriber station 14, and the caller has a telephone at a caller station 16. The caller and subscriber are Connected to the public telephone network 11 via ports A and B, respectively, to the telephone company switch 17. The switch 17 interconnects with other switches and stations.

The heart of the present invention is the intelligent peripheral (I/P) 18. The I/P 18 includes a telephone network interface unit 20, a voice prompt/record and control unit 22 and a system controller with memories 24. Path 26 represents the bi-directional audiopath and path 28 represents the signalling path between the I/P 18 and the public telephone network 11. Port S is the interface between the telephone network interface unit 20 and path 26. The audio path 26 could be analog lines, analog trunks, digital lines, or digital trunks in the form of T1, T3, ISDN BRI, ISDN PRI, or some other digital format. The signalling path 28 connecting the two systems could be entirely separate, travelling over different mediums, from the audio path or travelling over the same physical path and be distinguished from the audio by time division, frequency division, or some other multiplexing method. For example, path 26 could be in the form of release link trunks delivered in the digital form T1. In this case the DTMF station address signalling, on-hook/off-hook information and ringing is delivered over the same audio path as the voice.

Generally, when a caller calls a subscriber by dialing a number associated with the I/P 18, switch 17 sets up an audio path between port A and port C. Switch 17 then signals I/P 18 that there is an incoming call via port C, I/P 18 acknowledges via the network interface unit 20 and then switch 17 sends the station address to I/P 18. I/P 18 then places the call on hold by hook flashing. Next, I/P 18 transmits the station address of the subscriber to switch 17 and an audio path is set up between port C and port B. I/P 18 then hook flashes to set up a three-way connection between port A, B, and C. However, if switch 17 has the feature of auto three-way conference, all three ports would automatically be connected. After the three-way conference is set up, I/P 18 would hang up and the connection between port A and port B would be held as long as the caller and subscriber wished to converse. The parties located at the respective stations 14 and 16 are mutually anonymous, but both are aware of respective distinct telephone numbers of the I/P 18 through which communication with complete confidentiality is assured, all of which will be explained in detail hereinafter. The details of a billing terminal, credit authorization facility, and other various aspects of the invention may be found in the aforementioned patents.

Figure 2:
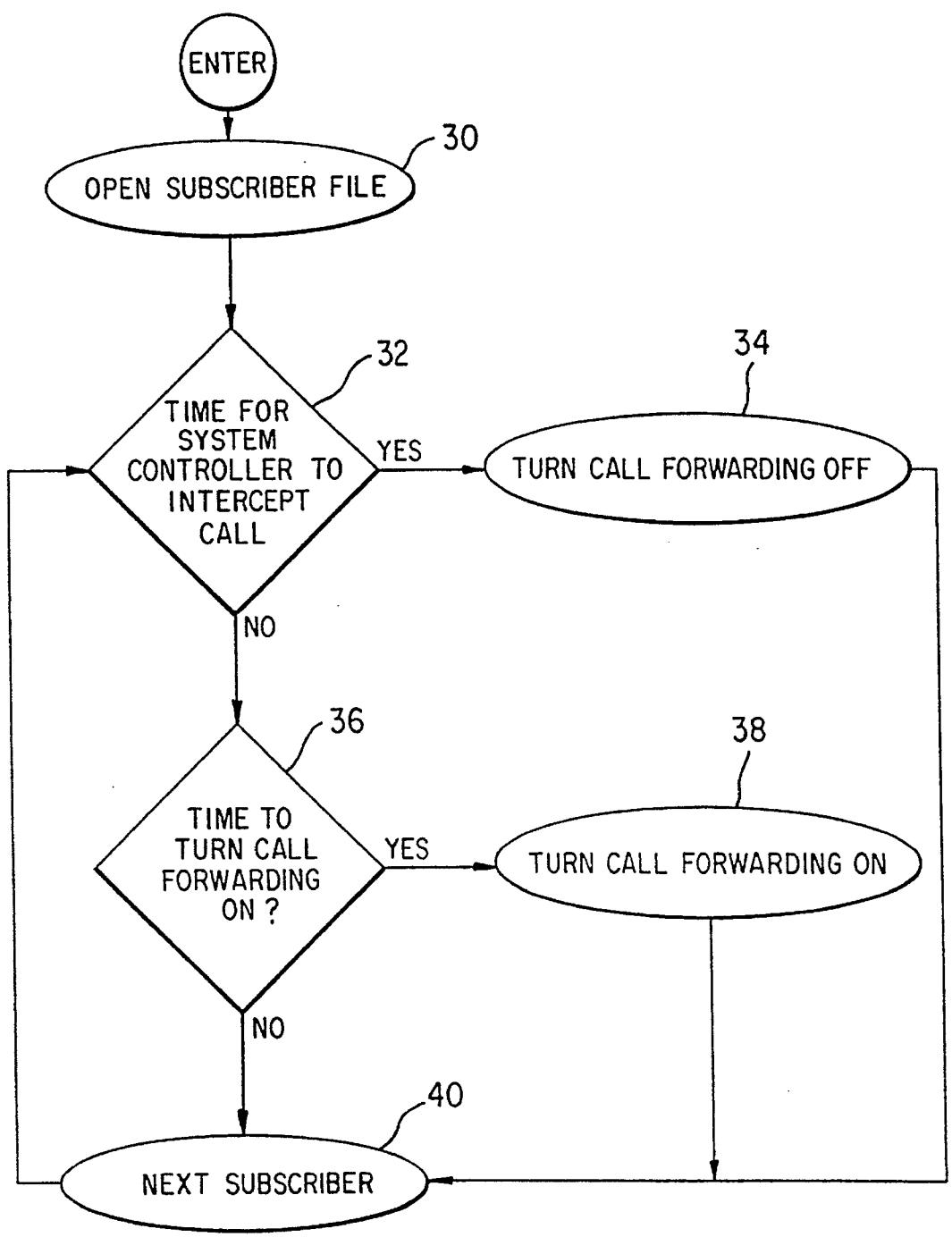
FIG. 2 is a general flow chart diagram illustrating the improvement of the present invention.

Referring to FIG. 2, the improvement to the anonymous interactive telephone system is generally shown by way of a flow chart illustrating the call forwarding supervisory task performed by the system controller 24. Each subscriber communicates with the system controller 24 by telephone to program the system to perform specific tasks. The subscriber interfacing program will be described in more detail hereinafter. One of these tasks relates to the active times during which the subscriber desires to have calls from callers, who desire to communicate with that particular subscriber, forwarded by the system directly to the particular subscriber to allow communication between desirable callers of the particular subscriber. This information is stored for each subscriber in a subscriber file in the system controller 24. Also, subscribers may program when calls are to be intervened by the I/P 18, during times called inactive times.

The call forwarding supervisory task program begins at step 30 by opening the subscriber file for a particular subscriber. The system is constantly scanning each subscriber file. Information related to the activation and deactivation of call forwarding is processed for each subscriber file. In step 32, a scan is made to determine if there are subscriber programmed times during which the subscriber has indicated that calls from callers are to be diverted to voice mail (or another message service) at the specified time. If so, the system turns the call forwarding feature off for that particular subscriber in step 34 by interacting with the public telephone system. In step 36, a scan of the subscriber's file is made to determine if it is the time at which the subscriber desires to receive calls directly from callers. If so, the system turns the call forwarding feature on for that particular subscriber by interaction with the public telephone company network in step 38. The program then continues to the next subscriber at step 40. The time data is stored for each day of the week and may be changed by subscribers as often as desired. Additionally, these times may be published with the subscriber's advertisement.

Figure 3:
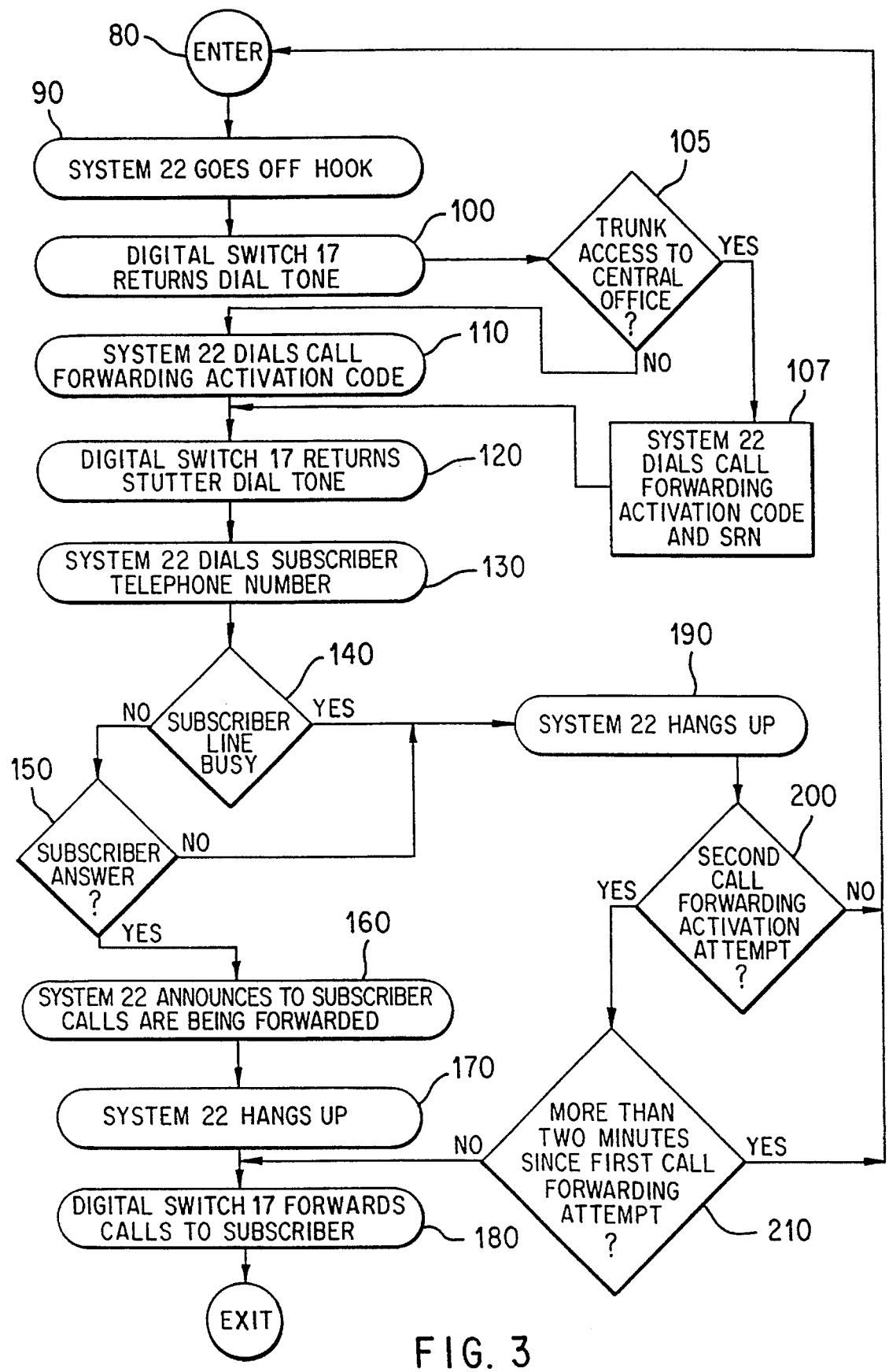
FIGS. 3 and 4 are flow chart diagrams illustrating in greater detail the system implementation programs corresponding to the improvement illustrated in FIG. 2.

FIG. 3 illustrates the system program 38 by which the system controller activates the call forwarding feature at the public telephone network switch 17 for a particular subscriber. Reference is also made to FIG. 1. The manner in which call forwarding is remotely controlled depends on the particular public telephone company services which are available to the I/P 18. Specifically, should the I/P 18 have trunk access to the central office, indicative of DID capability, it is necessary to supply a subscriber reference number (SRN) to the central office. This decision is depicted at step 105, but is not an actual step performed in the procedure. The actual step performed is step 107, which is necessary because the subscriber reference number (SRN) is embedded in the telephone number dialed by callers; a unique incoming line to the I/P 18 is not assigned to each subscriber. The I/P 18 could place the call to the central office via any one of a plurality of branch lines. On the other hand, if the I/P 18 does not have trunk access to the central office, but instead subscribes to Centrex services in which a plurality of lines connect directly between the I/P 18 and the central office, then at step 110, the I/P 18 need only dial a call forwarding activation code. This is because the particular subscriber for which call forwarding is being controlled is assigned a unique direct line from the central office. Thus, the central office will know for which subscriber to activate call forwarding upon processing the call made from the I/P 18 on that particular direct line. The following description relates to use with an AT&T 1AESS end office switch implementing Centrex services, or to configurations in which the I/P 18 has trunk access to the central office.

Initially, in step 90, the voice prompt/record and control unit 22 goes off-hook at port C in an attempt to obtain a dial tone on the line. The digital switch 17 returns dial tone on the line in step 100. Next, in steps 105, 107 and 110, the voice prompt/record and control unit 22 (under command of the system controller 24) dials a call forwarding activation code either with or without the SRN, depending on the type of telephone services subscribed to by I/P 18, as explained above. The call forwarding activation code could be any number of digits, but is typically three digits. With a Centrex type of call forwarding system described above, the digital switch 17 returns a stutter dial tone at step 120 acknowledging access into the call forwarding service. Thereafter, the voice prompt/record and control unit 22 dials the subscriber telephone number at step 130.

The system controller 24, through control unit 22, monitors the response in step 140 and if the subscriber answers at step 150, the voice prompt/record and control unit 22 announces to that particular subscriber that calls directed to the I/P 18 for him/her are being forwarded directly to the subscriber. The control unit 22 then hangs up in step 170 and the digital switch 17 is thereby programmed in step 180 to forward calls directly to the subscriber in response to receiving a call dialed to the corresponding published subscriber reference number.

If the subscriber's line is busy or the subscriber does not answer, the voice prompt/record and control unit 22 hangs up in step 190 and may make subsequent attempts to reach the subscriber, and thus enabling call forwarding. Call forwarding is activated after the second forwarding attempt is made to a busy number. This occurs if the second call forwarding activation attempt is made less than two minutes from the first attempt as shown in steps 200 and 210. Steps 190, 200 and 210 may not be necessary when interacting with certain telephone systems; through interaction with the switch 17 at steps 110 and 130, the switch 17 would be programmed to forward calls to the subscriber without requiring prior contact with the subscriber. In this regard, the digital switch 17 could signal acknowledgement of a particular step in this procedure in a number of ways including one or more tones or other signals.

Figure 4:
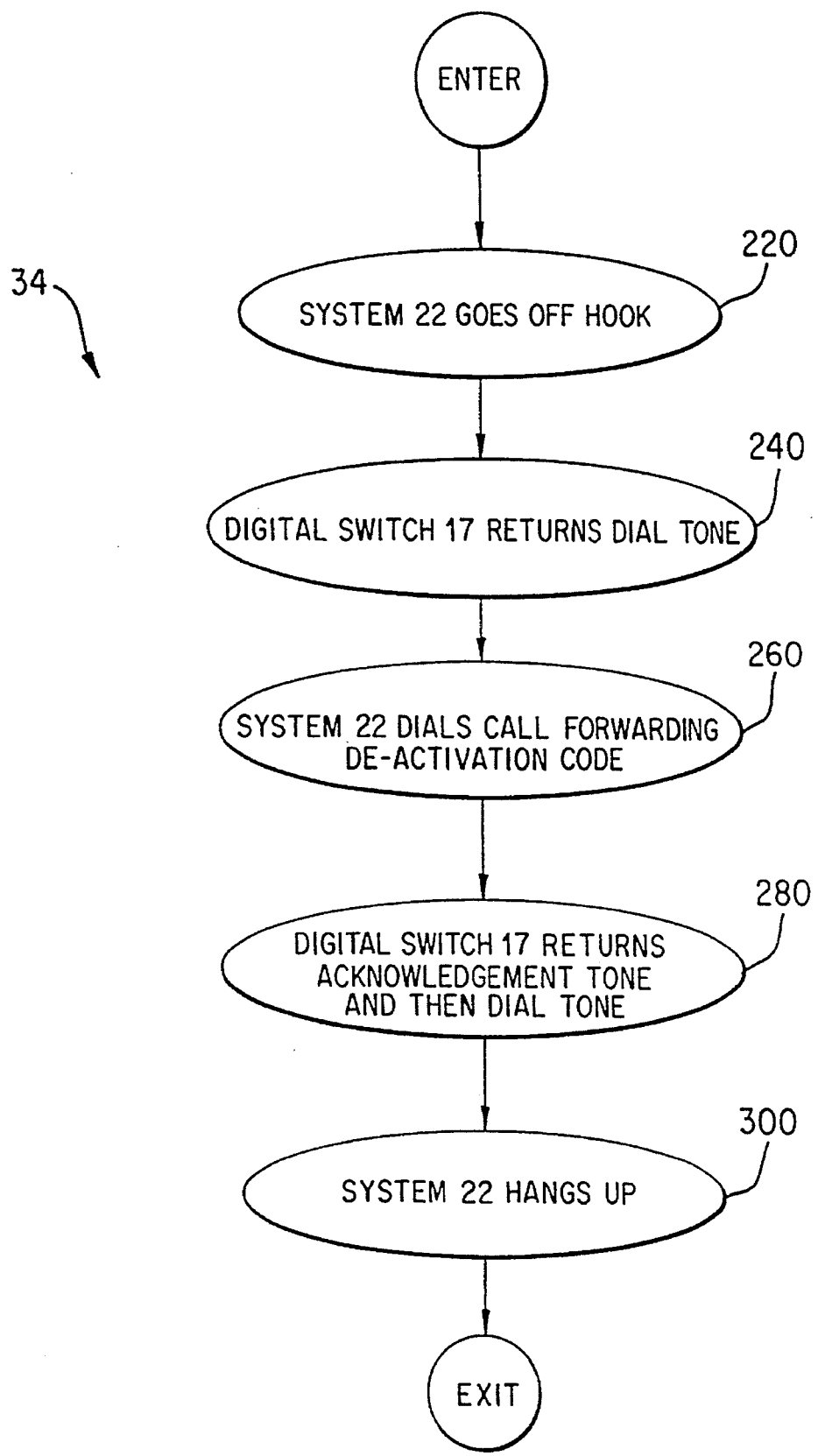

FIG. 4 illustrates the system program 34 for deactivating the call forwarding feature. The voice prompt/record and control unit 22 goes off hook at step 220 and the digital switch 17 returns a dial tone at step 240. The control unit 22 then dials the call forwarding de-activation code in step 260 (possibly together with the subscriber's reference number depending on the type of telephone service subscribed to by the I/P 18) to deactivate call forwarding for that particular subscriber. The digital switch then may respond with an acknowledgement tone in step 280. The control unit 22 then hangs up in step 300.

Figure 5:
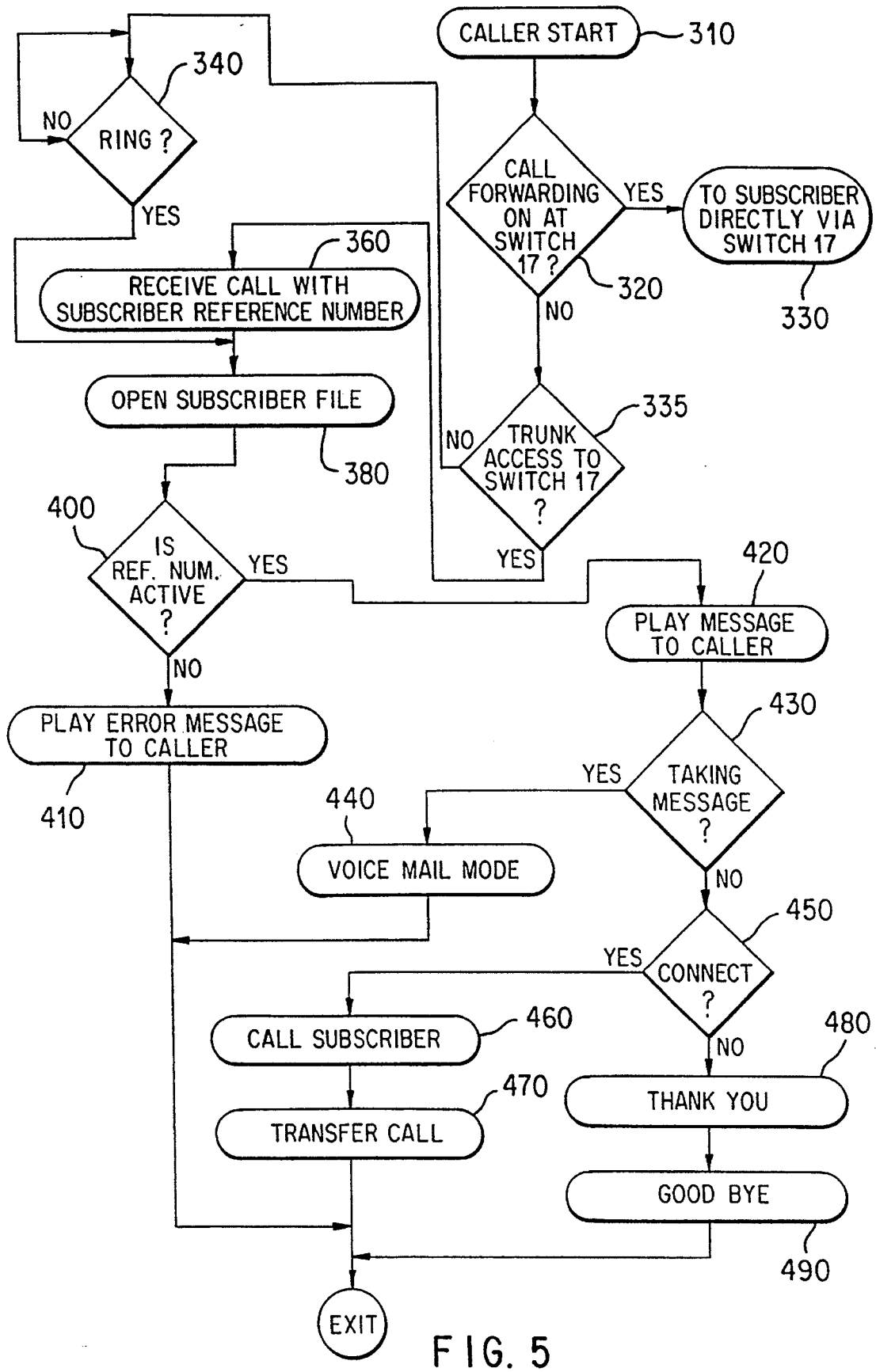
FIG. 5 is a flow chart diagram illustrating the caller interfacing program according to the present invention.

With reference to FIG. 5, taken in conjunction with FIG. 1, a detailed description of the operation of the I/P 18 during interaction with a caller follows. The caller initiates the process by calling the I/P 18 at step 310. Steps 320, 330, and 335 which are not part of the system program but are shown for explanatory purposes, depict the manner in which the digital switch 17 handles the call made by the caller. If the call forwarding feature is activated at the time of the call, the call is forwarded directly to the subscriber as shown by step 330. Otherwise, the call is allowed to pass via the digital switch 17 to the I/P 18 where the line will ring at step 340. The call is received by the I/P 18 at step 360 together with the published subscriber reference number (which is embedded in the telephone number in accordance with the DID feature). At step 380, the subscriber reference number is used to access the corresponding subscriber file to determine in step 400 whether this subscriber is active. (Both the system and the subscriber can make the reference number inactive.) If the reference number is not active or is otherwise an invalid number, a message is announced to the caller at step 410. Otherwise, the procedure continues to step 420.

If the subscriber reference number is active, the system, via the voice prompt/record and control unit 22, plays a message to the caller at step 420. This message may include one or more of the following: (1) an announcement that the caller should call back after a certain time; (2) an announcement that the item for sale has been sold; (3) a message describing the item for sale; (4) a message to prompt the caller to leave a message for voice mail. Meanwhile, the system controller 24 then determines, based on the data in the subscriber's file, if the subscriber is taking messages, at step 430. If so, the voice mail mode is entered at step 440. As described in the prior related patents, a call back reference number is assigned to the message to permit anonymous subscriber retrieval of the message. Otherwise, the caller is given an opportunity to be connected to the subscriber at step 450.

In accordance with a preferred embodiment of the present invention, subscribers may program the I/P 18 to intercept calls even if they are otherwise available to receive them. For example, a subscriber is able to record a further advertising message for his/her product or service. This message is played to the caller at step 420. The subscriber may program the system to then provide the option to the caller in step 450 to be connected with the subscriber in steps 460 and 470. If the caller declines this option, the caller is disconnected from the system in steps 480 and 490. Moreover, as will be described in conjunction with FIGS. 34 and 35, the subscriber may designate a block of time as privacy hours during which he/she wishes not to receive calls.

Figure 6:
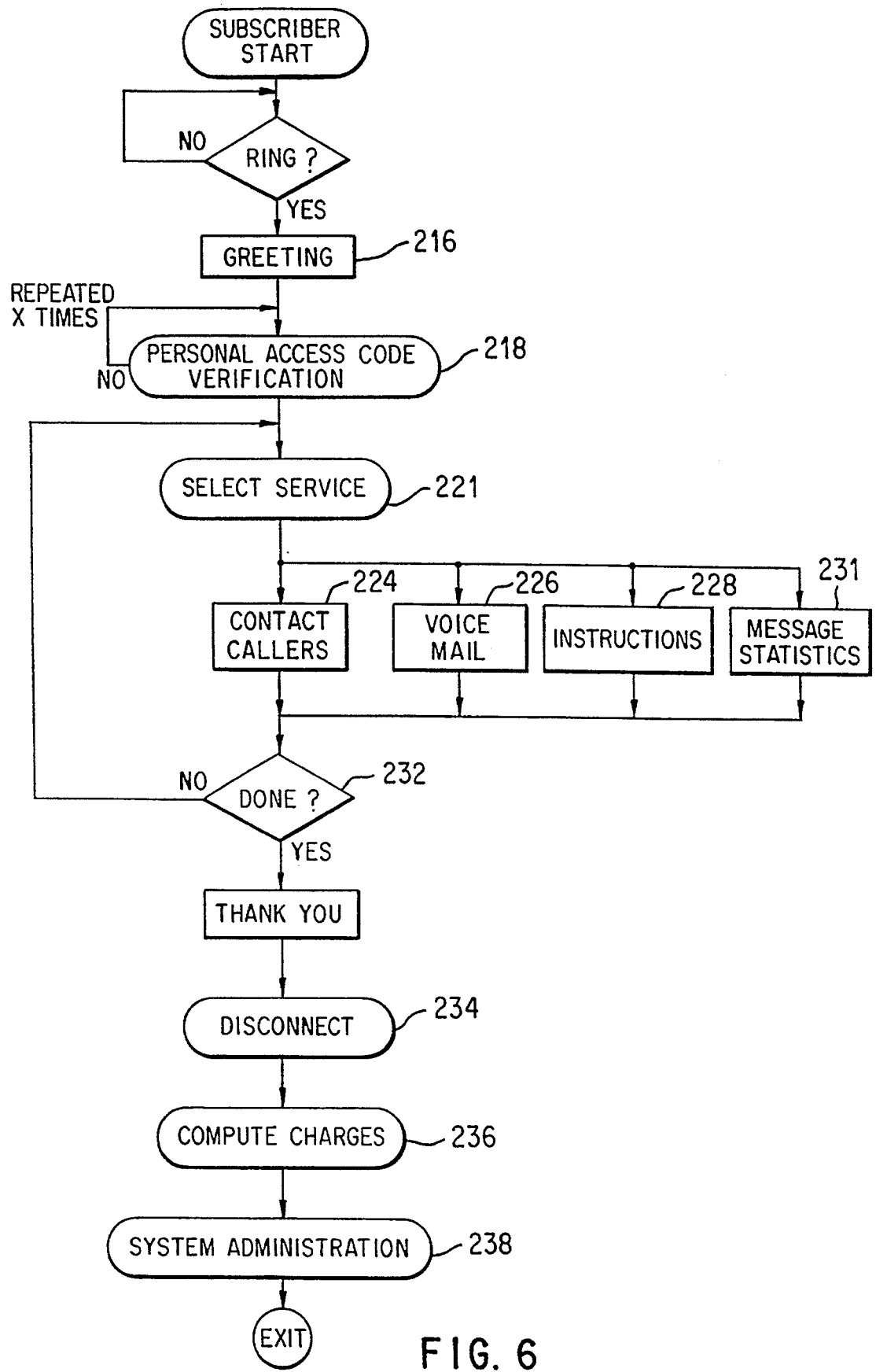
FIG. 6 is a flow chart diagram illustrating a subscriber interfacing program according to the present invention.

FIG. 6 illustrates the subscriber interfacing program in accordance with the present invention. This program is initiated by an incoming call from a subscriber station 14. Such an incoming call is met by a greeting at step 216 originating from the voice prompt/record and control unit 22. The subscriber, who at this point of the communication is not identified by the system as a subscriber, is prompted to enter by Touch-Tone input, an access code which is either the same as the published subscriber reference number, or if more security is desired, an unpublished code which is given to the subscriber when initiating the service, or the subscriber's own private telephone number. The access code is then verified at 218 and at this time the system is apprised that the party is a subscriber.

Upon verification of the access code of the subscriber, the subscriber may make a selection from a variety of services pursuant to a service selection program 221. In accordance with the embodiment illustrated in FIG. 6, the menu of services includes a contact caller service 224, a message review or voice mail service 226, an instruction entry service 228 and a message statistic service 231. After the selected services are performed, the program continues as indicated at 232 to a disconnect operation 234. This is followed by a charge computing step 236 and a system administration step 238. It is noted that the I/P 18 may receive and process multiple calls from subscribers simultaneously.

Many of the programs for performing the services shown in FIG. 6 have been described in detail in the prior related patents. Save for instructions service 228, these programs remain the same in the instant invention.

Specifically, the custom message service of the present invention permits subscribers to leave original messages in their own voices or direct the system to leave a particular message in a voice generated or recorded by the I/P 18. This is used in step 420 of FIG. 5 when a caller has been directed to the I/P 18 during such times specified by a subscriber. The custom message may, for example, comprise a further description of an advertised product or service or a personal greeting.

Figure 7:
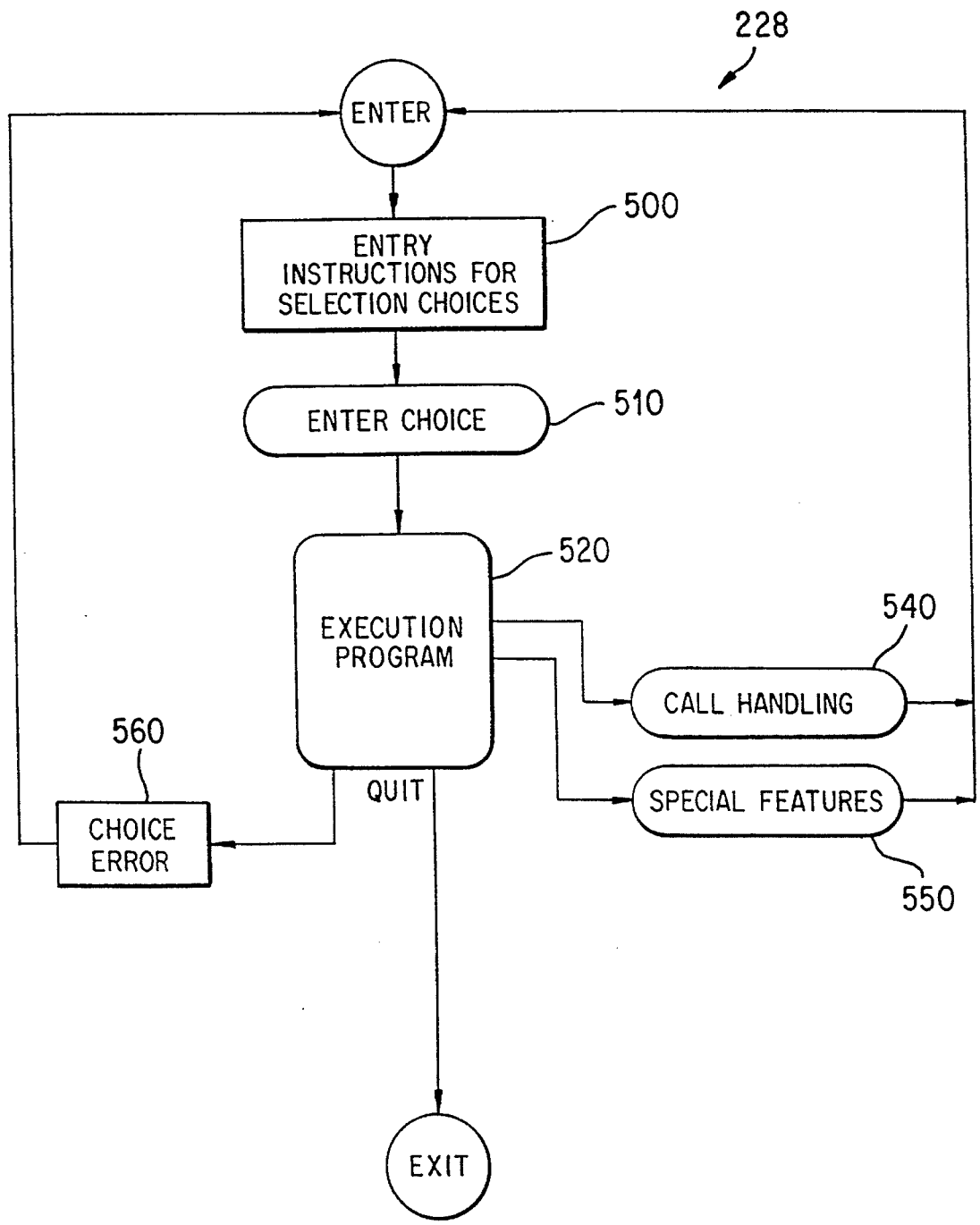
FIG. 7 is a flow diagram of the subscriber instruction program according to the present invention.

FIG. 7 illustrates the instruction program 228 in more detail. In accordance with present invention, subscribers are able to telephone the I/P 18 to program the system to respond to callers. In step 500, the subscriber is prompted to enter instructions for selecting the parameter which he/she desires to program. This choice is entered by the subscriber in step 510. A program is then executed at step 520 to access the choice selected by the subscriber for that subscriber's file. Such choices include a call handling program 540 which defuses the manner in which calls are handled for the subscriber. Such call handling options could be, for example, to block or allow calls from a telephone number which left a particular message, or to automatically dial a number from which a particular message was left. Another option under the call handling program 540 may include the choice of callers being told to leave a message, all calls should be screened, all calls should be put through, to block the last caller, put the last caller through without screening, or call the last caller back. The third option is special features 550 which can include a variety of different choices. One choice is for selecting a standard system voice greeting or recording a personal custom greeting which callers would hear. Another choice is for activating, deactivating, and selecting privacy hours which are times when callers are not to be disturbed. The privacy hours function is described below in conjunction with FIGS. 34 and 35. Other choices under special features include wake up call, and message delivery; the latter being when the subscriber is called and played any messages they have. The subscriber can activate, deactivate, or enter a time for which these two actions are to occur. Two other choices are call forwarding and find me. Find me is a variation on call forwarding in which a list of phone numbers is called to locate the subscriber. Both choices can be activated or deactivated and require the entry of telephone numbers. Should the subscriber choose an incorrect parameter, an error is detected in step 560 and the program starts over from step 500. Based upon this information, the I/P 18 is able to activate and de-activate the call forwarding function at the public telephone central switching station pursuant to the procedures shown in FIGS. 2–4.

Figure 34:
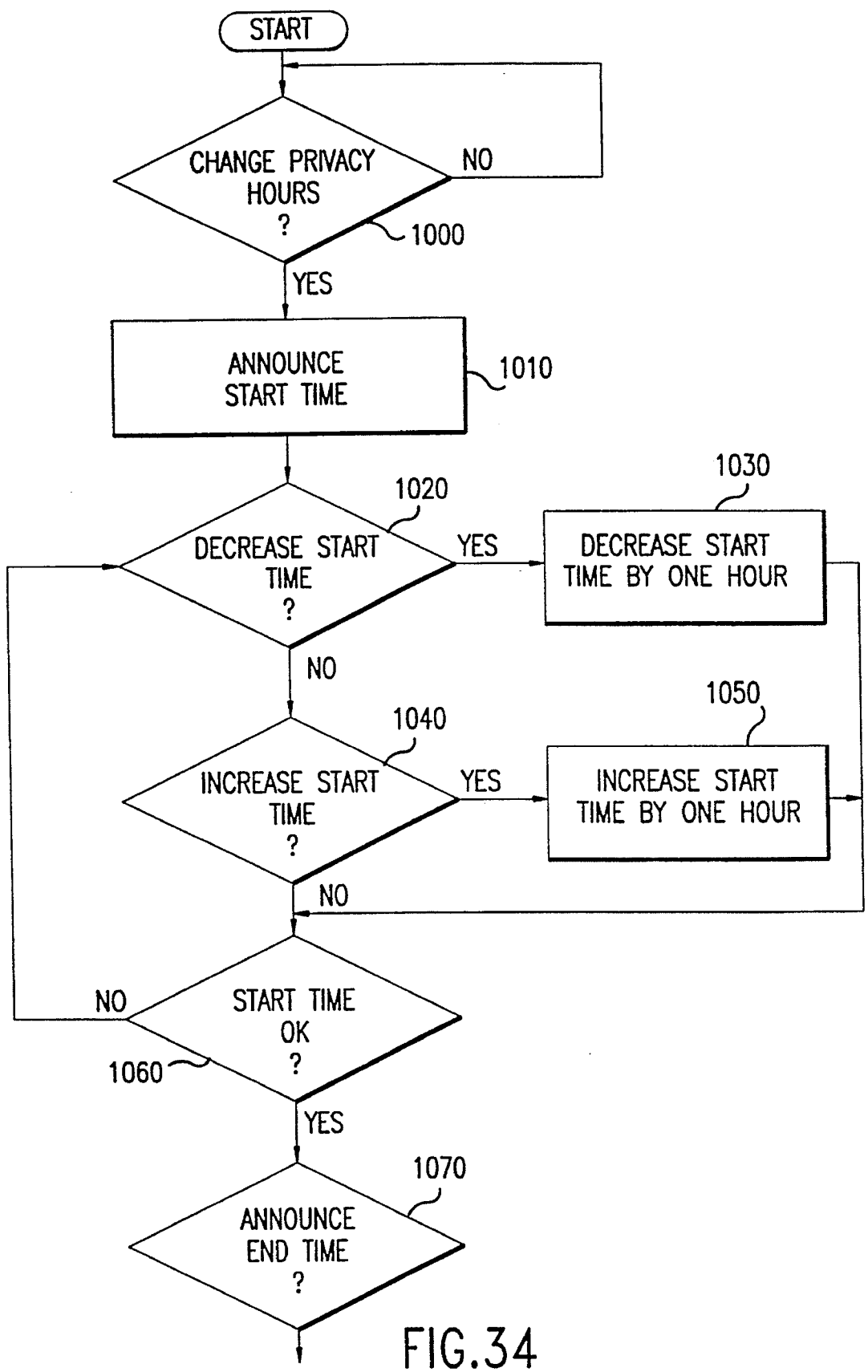
FIGS. 34 and 35 are flow chart diagrams depicting privacy hours routines which control the times during which the subscriber designates calls to be processed in accordance with the present invention.
Figure 34:
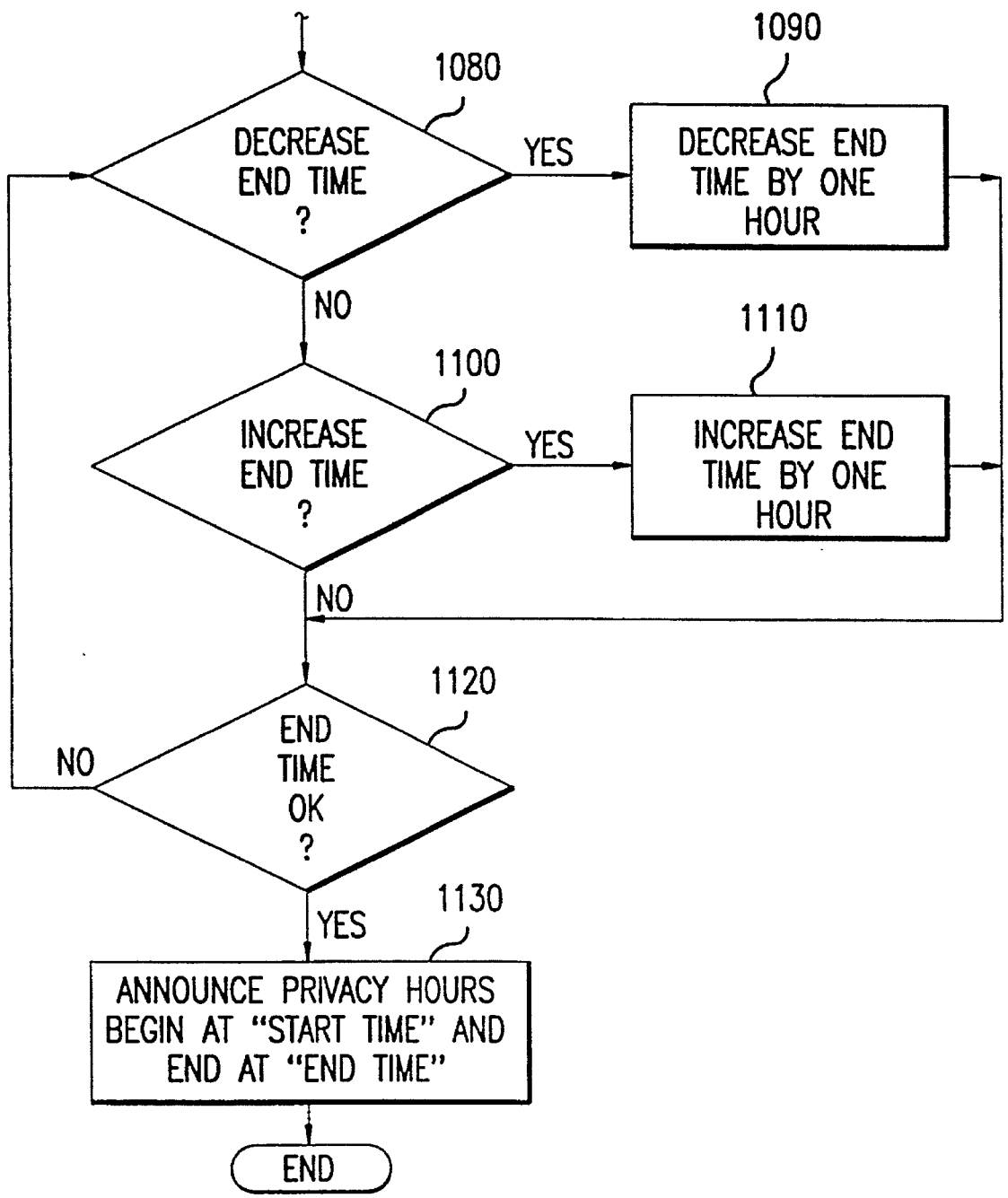
Figure 35:
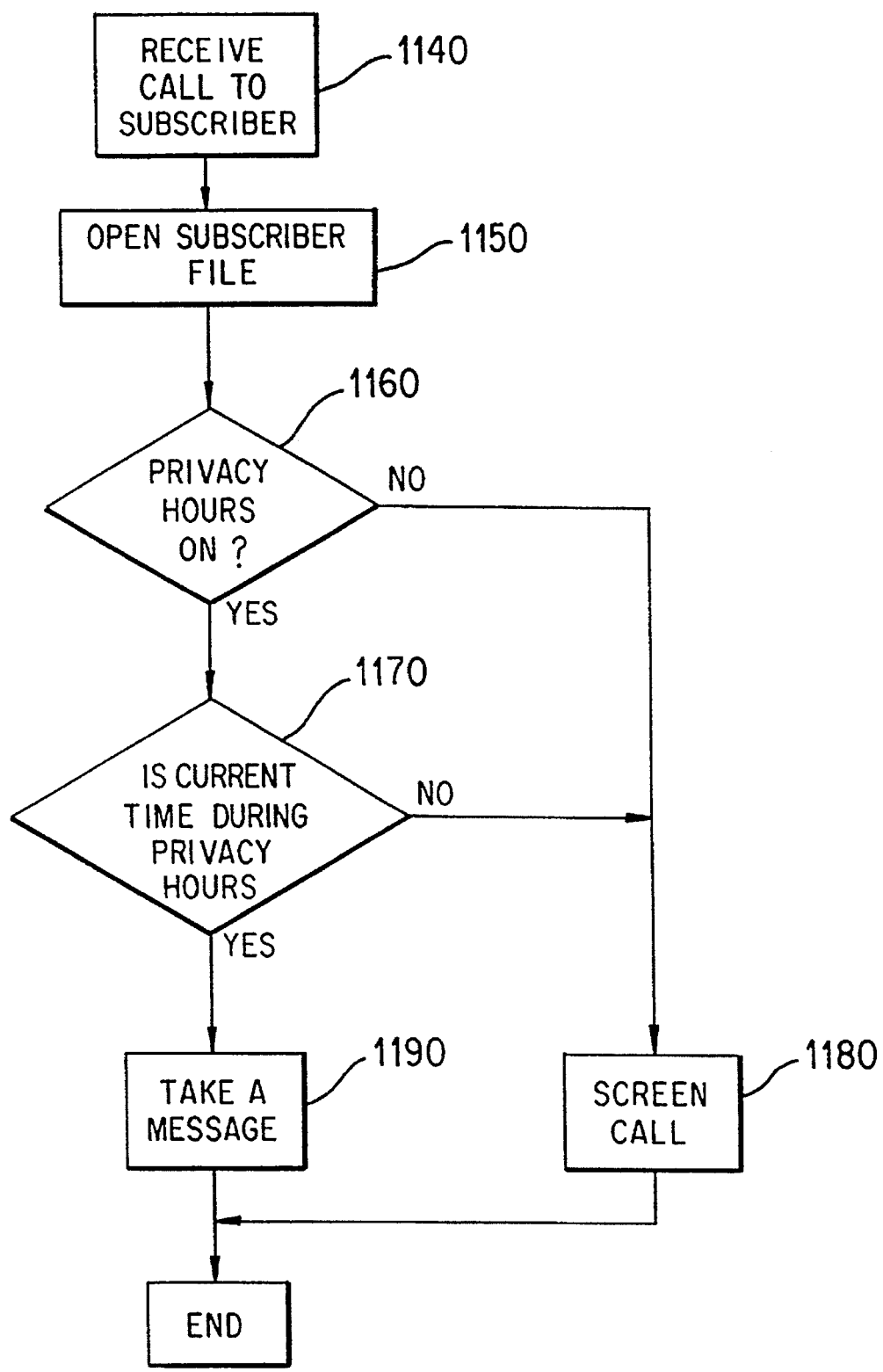

FIGS. 34 and 35 illustrate in detail the routines which control the times during which the subscriber designates calls to be processed. These functions are referred to as the privacy hours function. The privacy hours of a subscriber is the block of hours during which the subscriber does not want calls to be forwarded (directly by call forwarding or indirectly via the I/P 18) to his/her telephone number, but rather for the I/P 18 to intervene and process the call according to the instructions programmed by that subscriber. The block of time is designated by a start time and an end time. Calls will be intercepted during the block of time beginning with the start time and ending with the end time. In this regard, the block of time is referred to as the subscriber's privacy hours. This block of time is respected by the system every day until the subscriber changes the start and end time of the privacy hours. The subscriber need not call into the system again, unless he/she wishes to change the privacy hours.

FIG. 34 illustrates the routine which prompts the subscriber to set his/her desired privacy hours. In step 1000, the subscriber is asked if he/she desires to change his/her privacy hours. If so, then in step 1010, the system announces the prior designated start time (or a default start time such as 12:00 PM if no prior time has been designated). In step 1020, the subscriber is asked if the start time should be decreased (to previous hours). If so, then in step 1030, the start time is decreased automatically by one hour, and the routine jumps to step 1060. If the subscriber desires to increase the start time, then in step 1040, the system asks to increase the start time and does so by one hour in step 1050. In step 1060, after the start time is either increased or decreased by one hour, the subscriber is asked if this new start time is proper. If not, steps 1020–1050 are repeated until the desired start time is achieved.

Similarly, in step 1070, the prior or a default end time is announced to the subscriber. Steps 1080–1120 proceed in a manner similar to steps 1020–1060 to change the end time. The response of the subscriber may be a certain Touch Tone key on the telephone or a voice response such as "Yes" or "No" which is recognized by the system. Finally, in step 1130, the privacy hours are announced to the subscriber as beginning at "start time" and ending at "end time".

FIG. 35 illustrates the manner in which the system considers the privacy hours when processing a phone call to a subscriber. The reception of a call for a subscriber is depicted in step 1140. The subscriber's file is then opened in step 1150. Next, in step 1160, the system checks in the subscriber's file to determine if the privacy hours service is on for that particular subscriber. If not, then the call to the subscriber may be screened as shown at step 1180, and possibly the caller connected with the subscriber upon subscriber authorization.

If privacy hours is on for the subscriber, the system controller determines in step 1170 whether the time that the call is received is during the privacy hours. If so, then the caller is prompted to leave a message in step 1190. If it is determined that the call is not received during the privacy hours, then the call may processed as shown at step 1180.

The privacy hours function may be implemented in the first embodiment, whereby call forwarding activation and deactivation times are taken from the same data in a subscriber file.

In the preferred embodiment of the present invention, the DID feature is employed as disclosed in the parent application. That is, the subscriber reference number is embedded in the number published and dialed by the caller to reach the I/P 18. This is also the same telephone number which is recognized at the digital switch 17 to forward (or not to forward) calls directly to the subscriber.

Figure 8:
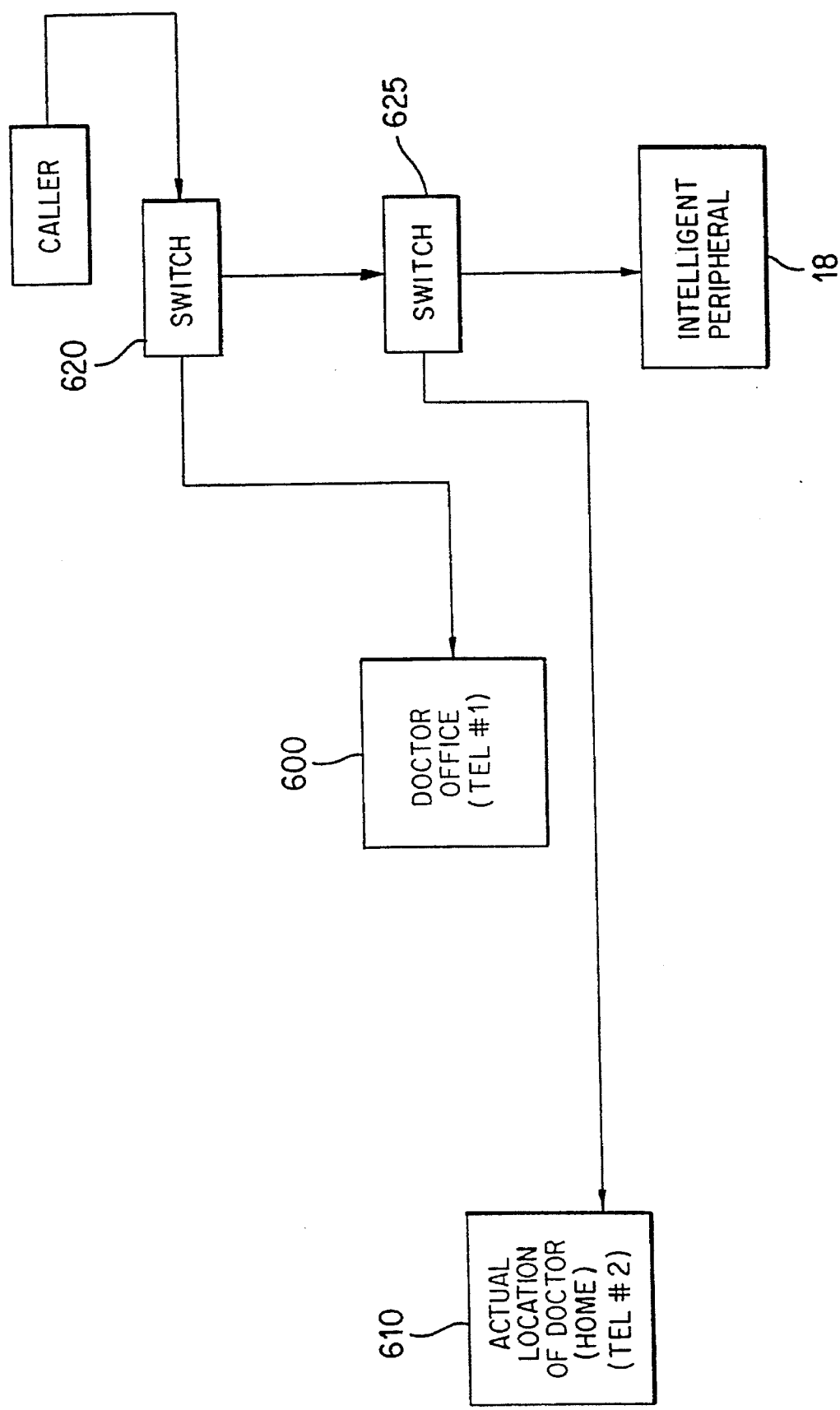
FIG. 8 is a flow diagram of the second embodiment of the present invention.
Figure 9:
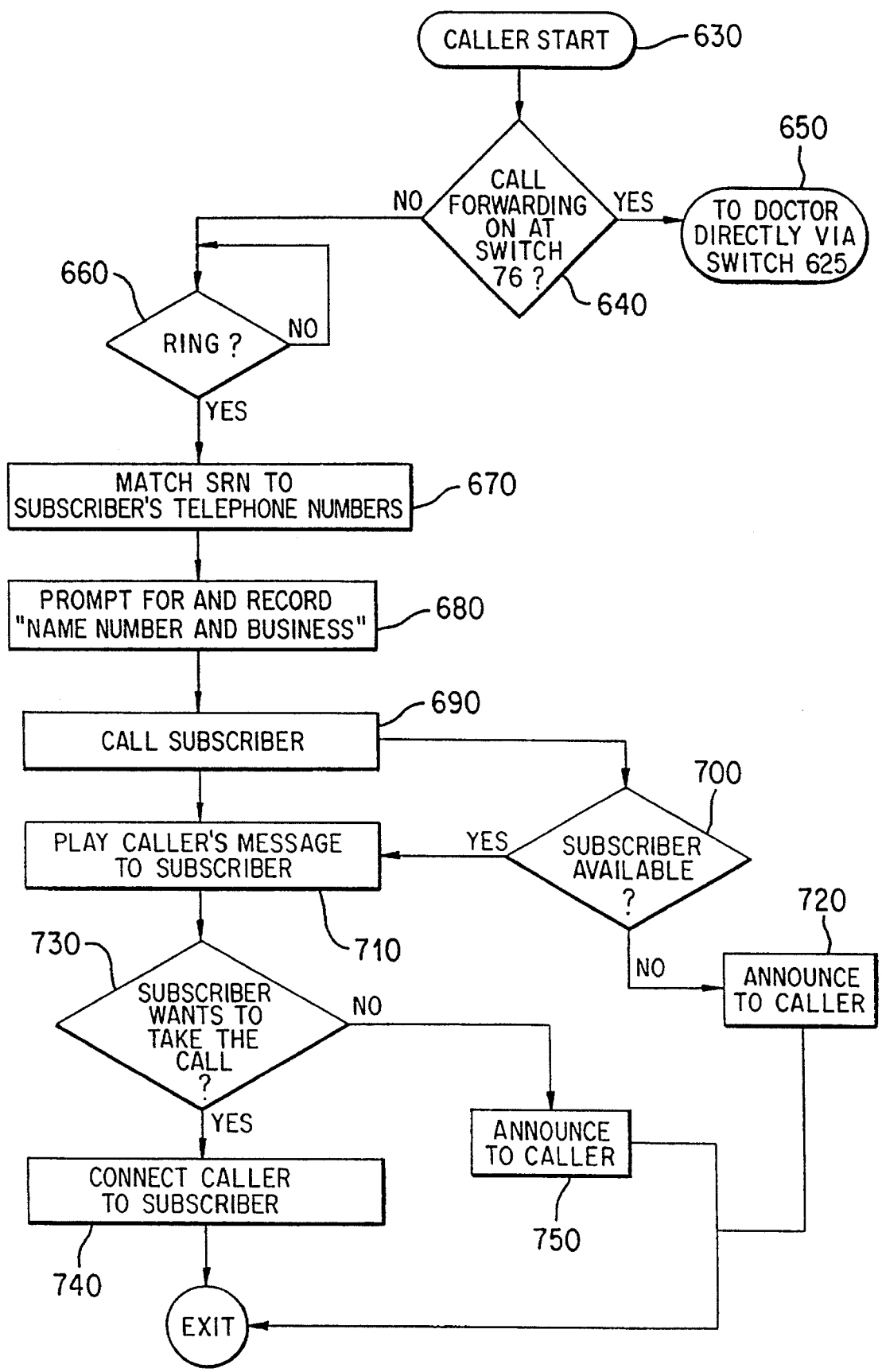
FIGS. 9 and 10 are flow chart diagrams illustrating in greater detail portions of the interfacing programs associated with the second embodiment of the present invention.
Figure 10:
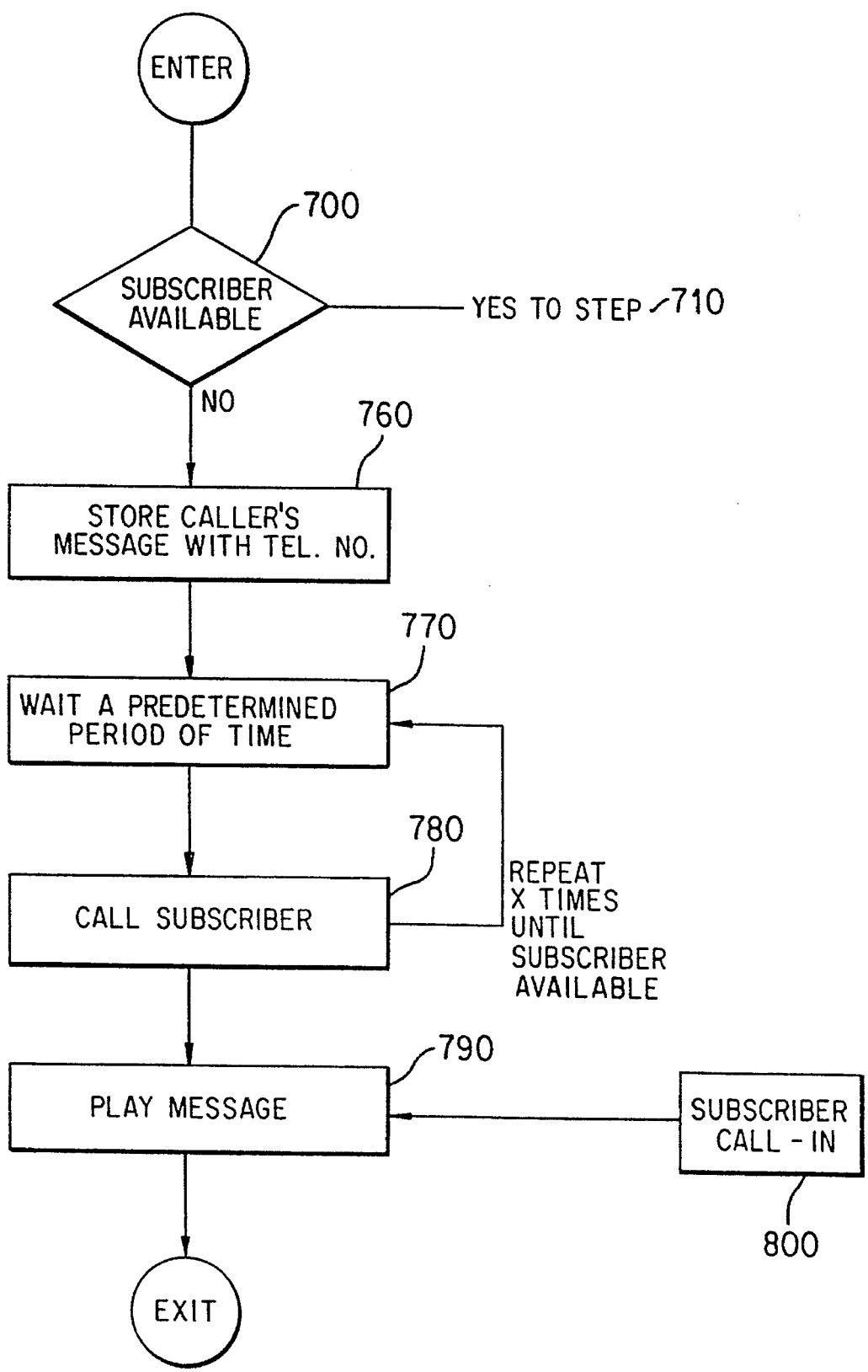

Turning now to FIGS. 8–10, the second embodiment of the present invention will be described. As disclosed in the co-pending related application, the anonymous interactive telephone system can perform a connecting service for persons with unpublished telephone numbers. In a more general sense, as described in the co-pending application and in the present application, this embodiment relates to a call screening method which allows subscribers to screen calls before accepting them. One such application involves subscribers (who may have unpublished numbers but want to be contacted) who may subscribe to the system of the present invention, which provides an automated call screening function for the subscriber. The following is a brief description of this service with reference to FIG. 8 while a more detailed description of how this service can be adapted to incorporate the call forwarding feature will thereafter be provided with reference to FIG. 9.

One example of the unpublished telephone number service is shown in FIG. 8. A doctor acting as a subscriber having an office 600 and home 610, supplies his/her unpublished (or published) number of the home 610 to the I/P 18. Patients are given the number of the system by the doctor, or if the doctor has call forwarding, the switch 620 (part of the public telephone system) switches the call from the office, to the I/P 18. (In this manner, the patient needs to know only one number for 24-hour access to the subscribing doctor.) In either case, the I/P 18 communicates with the switch 620 to activate and de-activate call forwarding with respect to the doctor's office telephone number or the telephone number of the I/P 18 given to patients. It is to be noted, however, that there is in essence two layers of call forwarding. One in which the doctor directly controls switch 620 to forward calls dialed for his office to the I/P 18 and the second layer is that in which the I/P 18 activates or de-activates call forwarding possibly through a different switch 625. Moreover, it is switch 625 through which the I/P 18 responds to the published DID telephone number corresponding to the doctor's home. Thus, during certain programmed times, calls will be directly forwarded to the doctor (at home) and at other times, the I/P 18 will intervene. These parameters are programmed remotely by the doctor, as previously described in conjunction with FIG. 6, and are carried out by the I/P 18 as previously described. In the latter case when the call forwarding feature is de-activated for a particular doctor, a patient desiring to contact the doctor who calls the office (or directly to the system) is directed to the I/P 18 and announces his name, the purpose of his call, and possibly his telephone number. The telephone number of the caller may also be obtained by ANI, also known as caller ID. The system by indexing the DID telephone number dialed by the patient to reach the doctor, calls the doctor to play the patient's message. The doctor therefore immediately receives the patient's message, without actually speaking to the patient, and can then call the patient when appropriate or chooses to be connected to the caller directly by hitting a key on his/her telephone keypad. On the other hand, if the doctor is not available to take the call (during such programmed times by the doctor or if the forwarded call is not answered), the system calls the requested doctor through an alternate telephone number, calls the next doctor "on call" etc. until a doctor is reached, or informs the caller of the unavailability of the doctor.

FIG. 9 illustrates the details of the second embodiment. The caller who desires to contact a subscriber (doctor) with an unpublished telephone number, dials the telephone number of the I/P 18 at step 630 either directly or via a call forwarding feature. If the subscriber has programmed the I/P 18 to command the central switching office to directly forward calls to his/her home at the time of the caller's call, then the caller is forwarded directly to the subscriber by the central switching office as shown by steps 640 and 650. Otherwise, the caller will be connected to the I/P 18 in step 660. (Steps 640 and 650 are shown only for explanatory purposes and are not actual steps of the program of FIG. 9 implemented by the system controller 24.) The subscriber's reference number (embedded in the called telephone number) is recognized, and the subscriber's corresponding and actual telephone number is found in memory. This is accomplished at step 670.

Once connected to the I/P 18, the caller is prompted to state his name, telephone number, and the purpose for his call at step 680. The voice prompt/record and control unit 22 records this message. Then, the subscriber's telephone number is called at step 690 and if the subscriber is available, as determined at step 700 at which the subscriber may be requested to enter a verification code, the caller's recorded message is played to the subscriber at step 710. Otherwise, a message announcing to the caller that the subscriber is unavailable is issued at step 720.

After the subscriber hears the caller's message, he then decides whether or not to take the call at step 730. If he so chooses (as by responding to a voice prompt by Touch Tone), the system connects the subscriber to the caller at step 740. Otherwise, at step 750, a message is announced to the caller saying that the subscriber is not available to communicate with the caller.

As shown in FIG. 10, if the subscriber is not available when contact is attempted through the screening steps 670–700, the caller's message, including the caller's telephone number announced by the caller, is recorded. The message may be stored at step 760. The subscriber may periodically call in to the system as shown at step 800 to check for messages which are indexed and in a subscriber message database as described in the aforementioned patent. In addition, the system may periodically call the subscriber, or try in priority several alternative subscriber numbers, until the recorded message is played to the subscriber. This might be necessary since persons with unpublished numbers do not typically know or suspect when somebody would try to contact them. Thus, as shown in FIG. 10, the caller's message is stored at step 760 and after the initial contact attempt, and a predetermined period of time indicated by step 770, the subscriber is called by the system at step 780. If the subscriber is available, the caller's message together with an introduction prompt is played to the subscriber at step 790. Steps 770 and 780 are repeated until the subscriber is finally reached.

Figure 11:
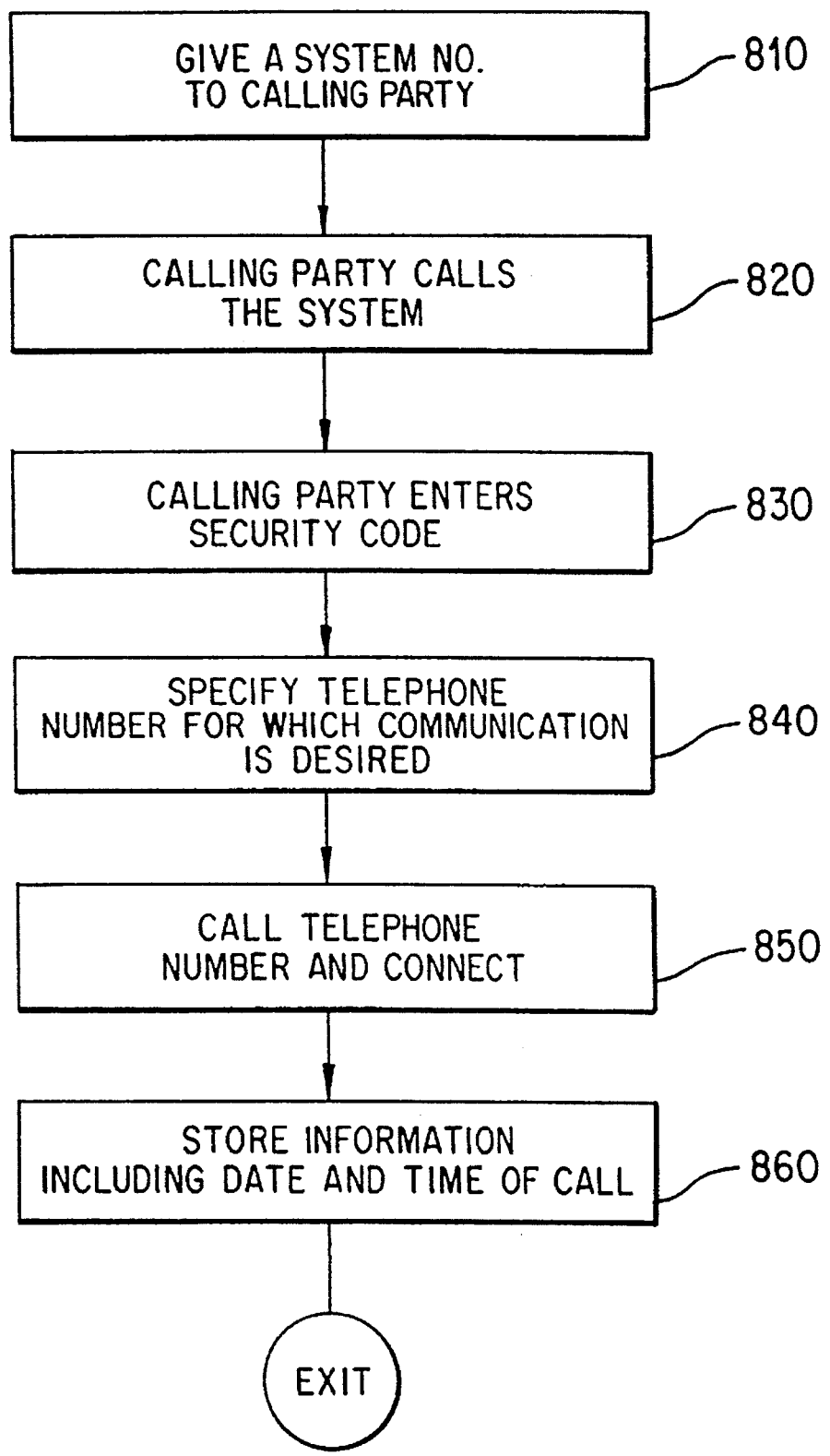
FIG. 11 is a flow chart illustrating the third embodiment of the present invention.

FIG. 11 illustrates a service according to the third embodiment of the present invention which preserves anonymity of outgoing calls of a calling party to a receiving party. The service is designed for persons who want to place telephone calls through the public telephone network without revealing any caller identification information to the called party, such as an ANI number (Caller ID). The calling party calls the system at step 820 and enters his/her security code at step 830. Although not specifically shown as such, if the security code is invalid, the process terminates. Otherwise, the telephone number for which the calling party wishes to communicate is specified at step 840 by allowing the calling party to enter the actual telephone number or a speed dialing option of the person with whom he/she wishes to communicate. Thereafter, the number is called at step 850. As the call is being processed, the system stores information including the number dialed, date and time the call is made at step 860.

By this arrangement, the calling party maintains his/her anonymity even if the receiving party has a service such as that provided by ANI or caller ID by which the originating number is made available to the receiver of the call. However, should a person receive any threatening or obscene telephone calls, the system has information of the time, date and originator of the call so that proper action by the law enforcement authorities can be taken.

Figure 12:
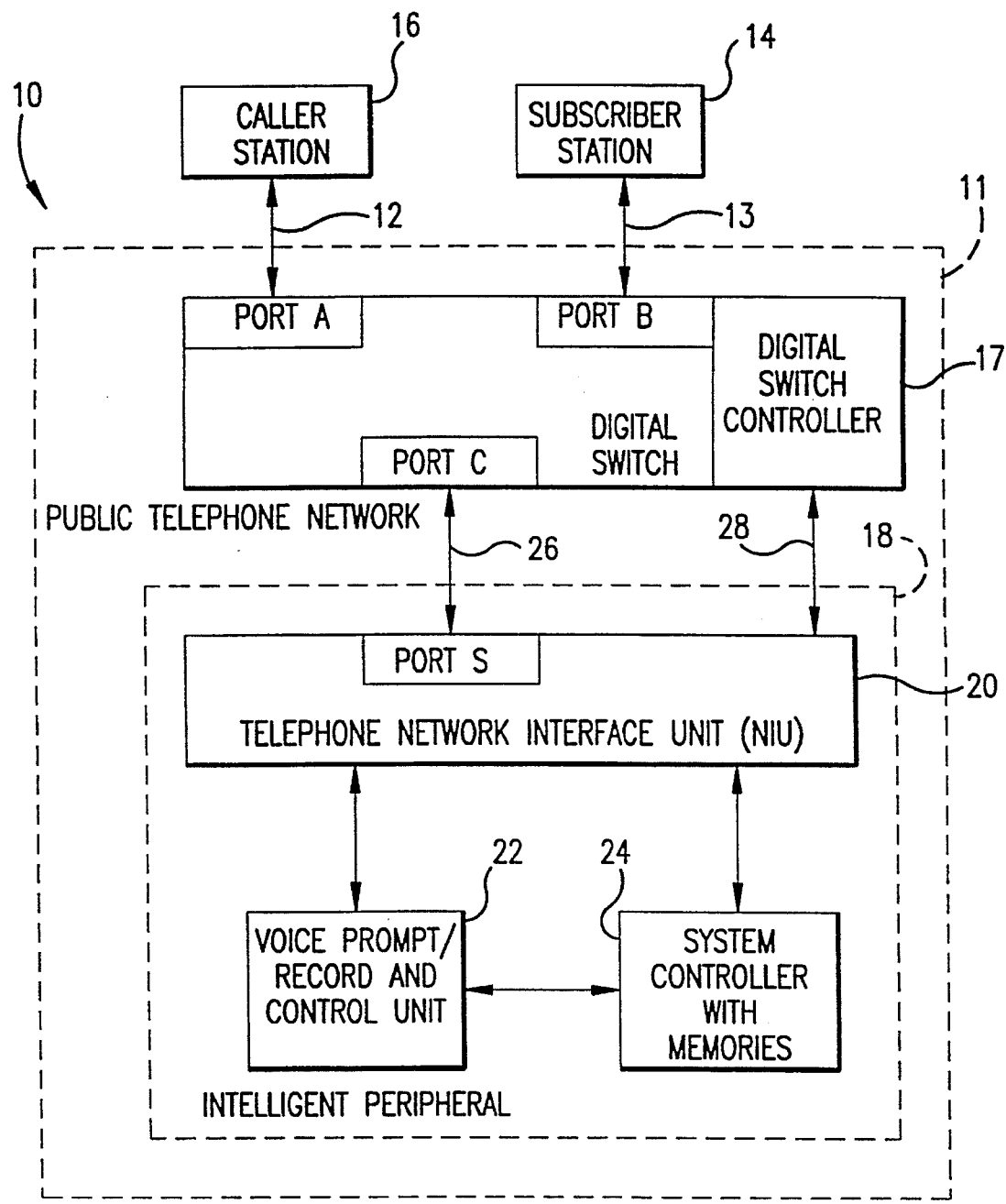
FIGS. 12–14 are block diagrams illustrating several variations of configurations using public telephone facilities to implement the anonymous interactive telephone system according to the fourth embodiment of this invention.

In accordance with another aspect of the present invention, the I/P 18 may be embodied as part of equipment in a public telephone company system. FIG. 12 illustrates that the I/P 18' may be part of a larger telephone company operated facility and a peripheral to the switch 17 within the telephone network. Certain of the functions are performed by one or more pieces of telephone company equipment.

Figure 13:
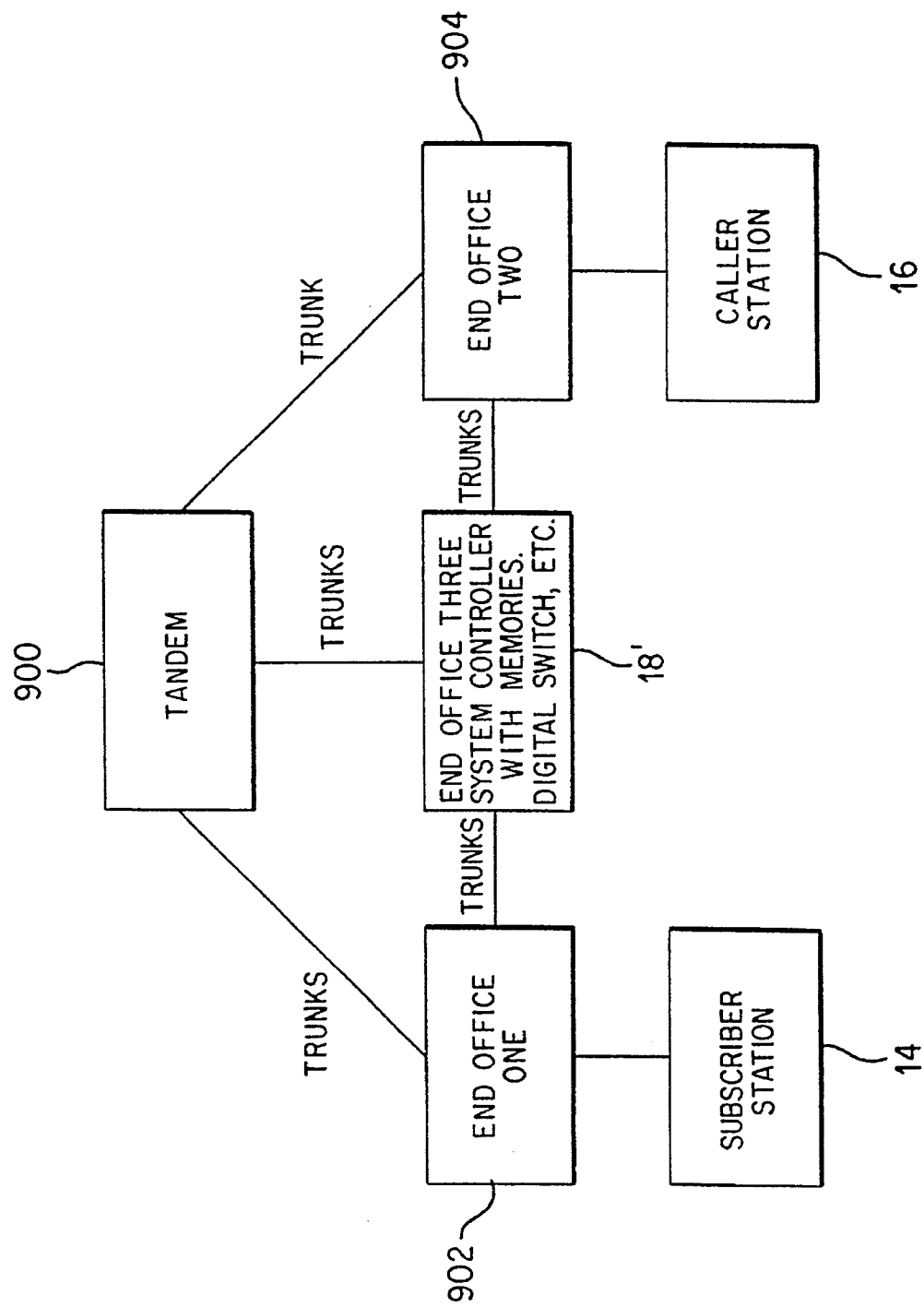

In particular, FIG. 13 illustrates a configuration in which the I/P 18' is formed as (or part of) an end office switch in a local exchange. This switch may be one of several end office switches known in the art, such as an AT&T 5ESS, a Northern Telecom DMS-100, or a Northern Telecom SuperNode. End office three is the only part of the network shown in FIG. 13 that needs to be added to implement the anonymous interactive telephone system and all of the functions of the I/P 18' previously described are performed by this office. The communication paths connecting the switches may be analog trunks, digital trunks, analog lines, or other digital communication paths. In operation, when a caller at caller station 16 wishes to contact a subscriber at subscriber station 14, the telephone call from the caller travels to the end office switch two 904, to the end office switch 18' to end office switch one 902 and to the subscriber station 14. The call could also be routed through the tandem 900 should any of the direct communication paths between end offices one, two or three be completely utilized. The I/P 18' also could be embodied as a tandem switch in the form of a Northern Telecom SuperNode, a special services switch such as a Summa Four SDS-1000, or in a toll switch such as an AT&T 4ESS which would be part of a long distance network such as that owned by AT&T. These are only three examples of the potential switches that could be used.

Figure 14:
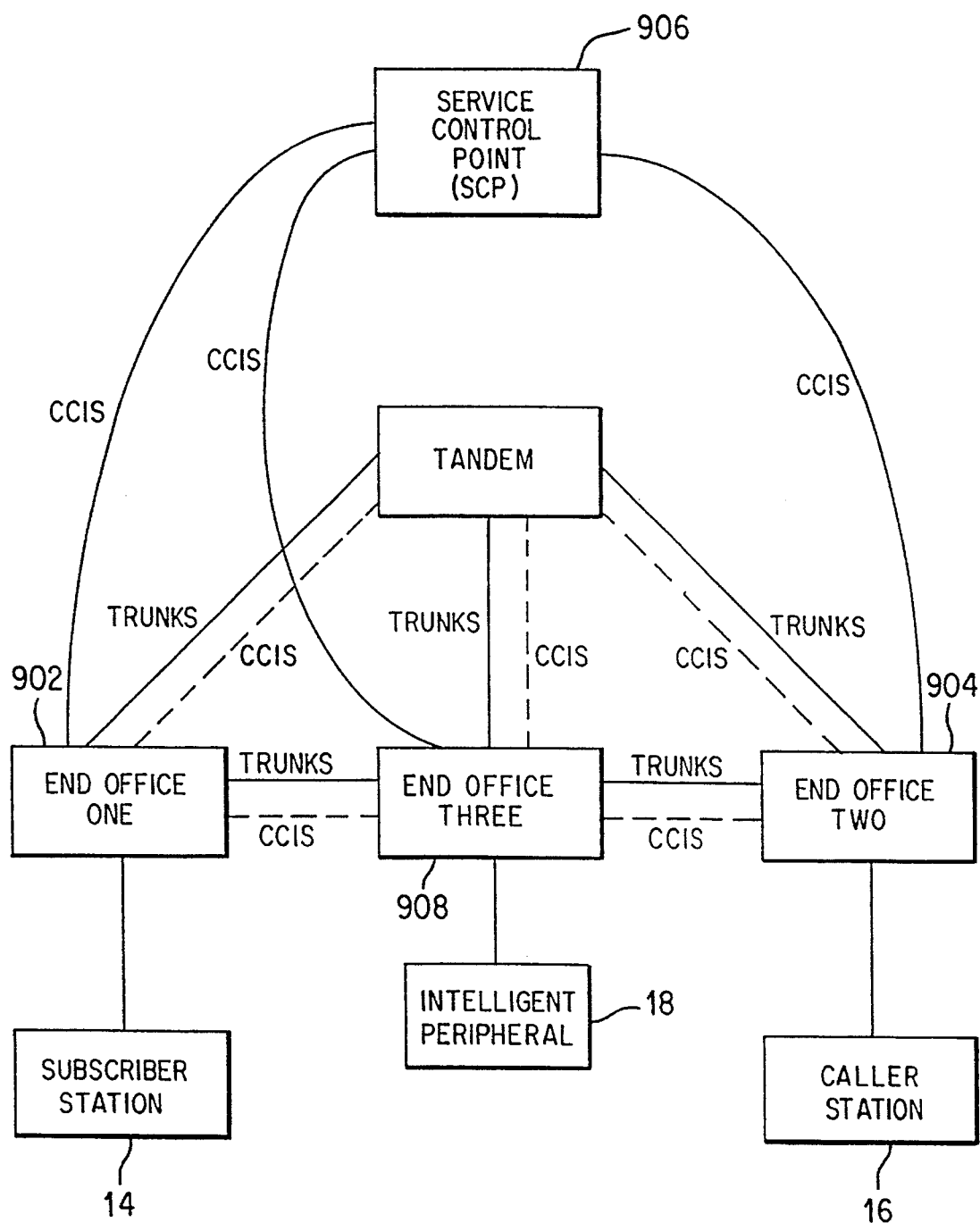

FIG. 14 illustrates a system which is similar to that shown in FIG. 13, but further includes an overlay network implementing common channel interoffice signalling (CCIS). CCIS is a network in which digital switches interact with each other, or other devices, utilizing data packets that travel over communication channels separate from the channels supporting the actual voice conversations. A remote database at Service Control Point (SCP) 906, contains the unique call processing instructions for implementing anonymous interactive communication. An SCP may be embodied, for example, by an AT&T 3B series computer. There may be several SCP's in a particular network, in which case each SCP stores information which identifies the address of other SCP's which store call processing instructions. In this manner, all the SCP's in the network know what each SCP stores. One other additional piece of equipment is an intelligent peripheral voice prompt/record unit to perform voice prompting, recording, recognition and the recognition of Touch Tone digits. The intelligent peripheral could also be connected to an SCP via a dedicated link not on the CCIS network. Also included in this system, though not shown for the sake of simplicity, are packet switches called Signal Transfer Points (STP) which route packets of information between SCP's and telephone company switches.

In this system, when a caller at caller station 16 wishes to anonymously contact a subscriber at station 14, he/she dials a telephone number with the appropriate embedded subscriber reference number. When end office two 904 receives the dialed number, it recognizes that special routing instructions are needed to complete the call for that dialed number. End office two 904 then sends a data packet to the database at the SCP 906 which, among other things, contains the number that caller station 16 dialed. Assuming the subscriber is taking calls, database 906 sends a data packet to end office two 904 which contains the subscriber's actual telephone number. End office two sends a data packet, via CCIS, to end office one 902 indicating a call is to be routed to end office one. End office one then sends an acknowledgement packet to end office two. End office two then seizes a trunk to end office one. End office one 902, after some additional handshaking packets have been exchanged, sends an acknowledgement message back to end office two indicating the connection between the two switches is complete. End office one 902 then rings subscriber station 14.

The following is a description of how a subscriber at subscriber station 14 would prevent calls from being put through, cause messages to be played to a caller, or allow a caller to record messages. The subscriber dials a system access number that terminates in end office three 908 where the intelligent peripheral 18 resides. The subscriber is then given the option of specifying that a caller would hear, for example, a "call back later" message, an "item has been sold" message, or a "description of the item for sale" message. The subscriber/advertiser could make the selection by either using Touch Tones or spoken words, both of which the intelligent peripheral 18 could interpret. The choice selected is stored in the database at SCP 906. When a caller at caller station 16 telephones the number in the advertisement, end office two 904 queries the database at SCP 906 which returns a telephone number at end office three 908. Upon the call reaching end office three 908, the caller is then played a message and may also be allowed to leave a voice mail message via I/P 18. If the caller subsequently is to be connected through to the subscriber, end office three 908 queries and is instructed by the database at SCP 906 to route the call to the subscriber station 14. If the caller is not to be connected through to the subscriber, end office three 908 is instructed by the database at SCP 906 to end the call (hang up). Furthermore, if the subscriber has chosen to have calls blocked for a specified number of hours, the database at SCP 906 would at the appropriate times route calls to the I/P 18 rather than to the subscriber station 14.

Figure 15:
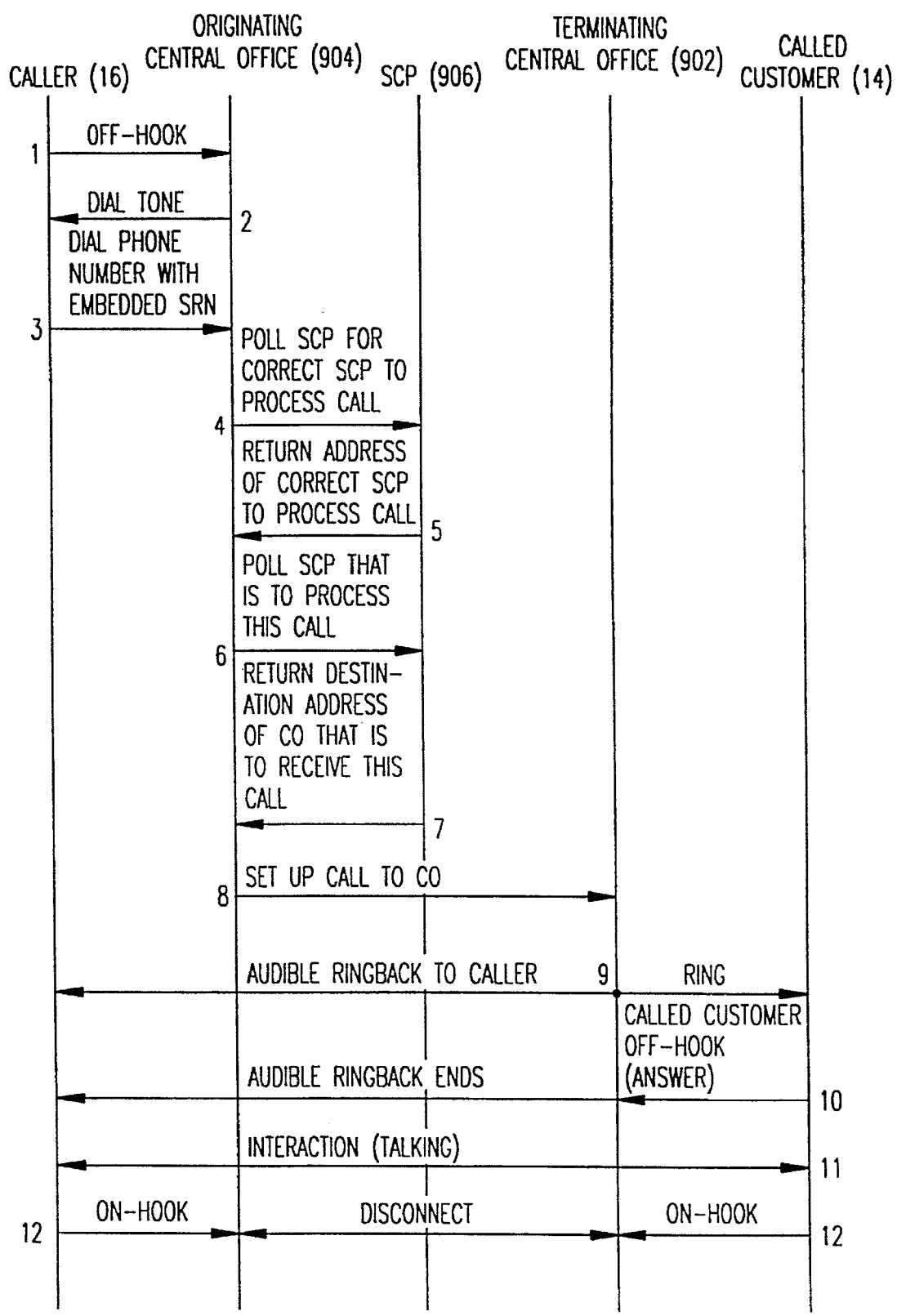
FIGS. 15–18 are diagrams depicting methods for implementing the anonymous interactive telephone system according to the fourth embodiment.

FIG. 15 illustrates in detail the steps that occur in the network shown in FIG. 14 when a caller dials a telephone number with an embedded subscriber reference number for a particular subscriber. In this procedure, a call is placed directly from a caller to a subscriber. Initially, the caller goes off hook upon which the central office 904 returns dial tone. The caller then dials a telephone number with an embedded subscriber reference number. The originating central office 904 examines the dialed digits and polls the SCP 906 to obtain routing instructions for the call by sending a data packet over the CCIS network which includes the dialed number as part of the routing address. The SCP 906 receives the packet and returns a packet that contains the routing address of the SCP that has the call processing instructions for this particular call. Next, the central office 904 polls the appropriate SCP that is to route the call. In this example, this is SCP 906. It is more likely that another SCP would be the one which contains the actual call routing instructions, but only one SCP is shown for explanatory purposes. The SCP 906 then returns the real telephone number of the subscriber. After this step, the call is processed in the same manner as if the subscriber had been telephoned directly.

Specifically, a call is set up to the end office 902 from the end office 904. The end office 902 rings the subscriber's telephone and supplies a ringback to the caller. When the caller answers, central office 902 stops supplying ringing voltage to the subscriber's telephone and also ends audible ringback. The caller and the subscriber are now in communication to talk. When one or both parties hang up, both central offices disconnect the voice path between the two switches.

Figure 16:
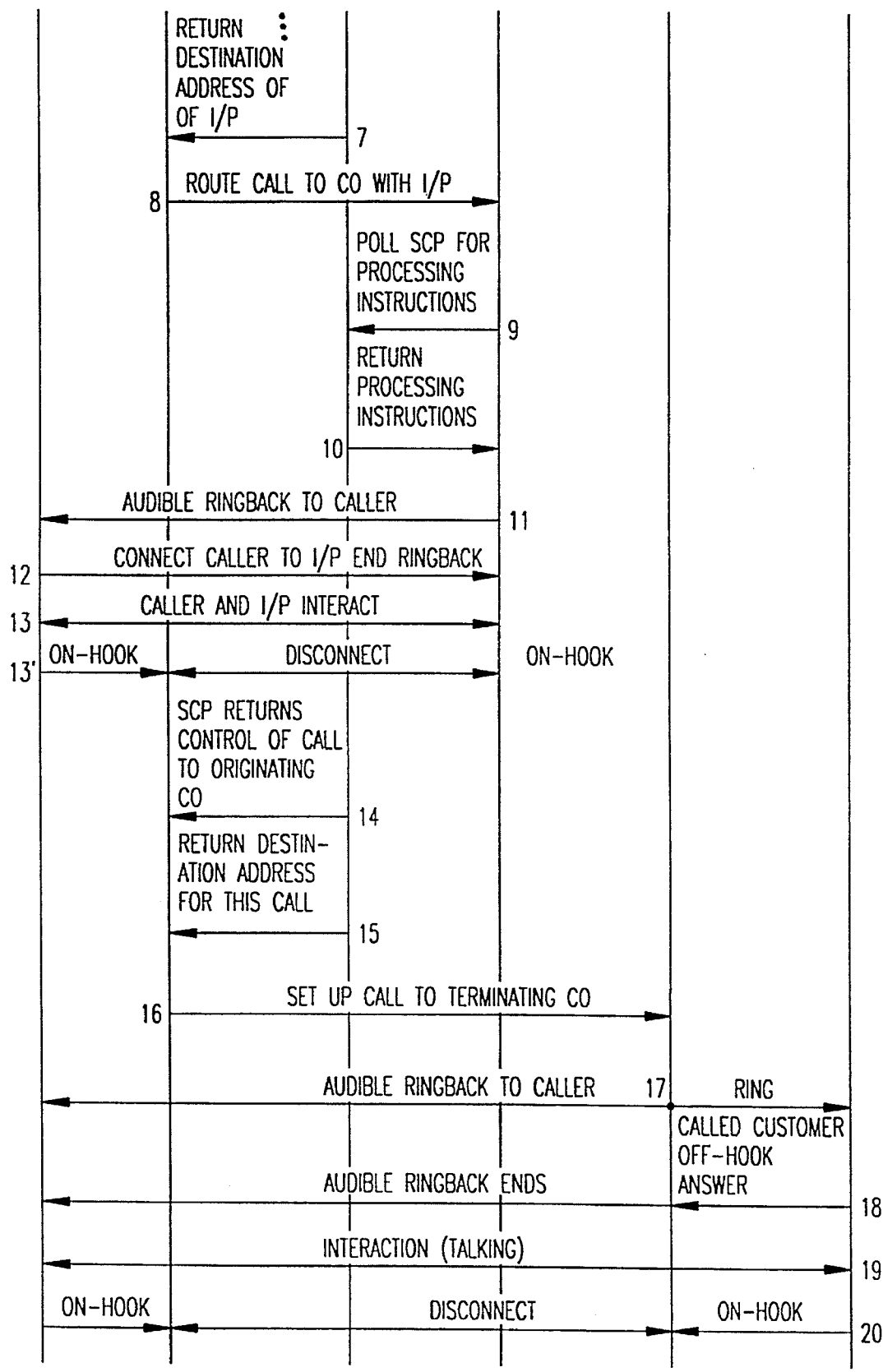

When a caller is to hear a recorded message, calls to the subscriber are routed to an intelligent peripheral (I/P) 18 associated with an end office 908. Calls to a subscriber are also routed to an I/P when the subscriber reference number is not included as part of the telephone number published in the ad, but is a separate number that appears in the ad. FIG. 16 depicts the steps that occur when a call routes to I/P 18 shown in FIG. 14.

The first six steps in FIG. 16 are the same as those in FIG. 15. Subsequent to these steps, the SCP 906 returns the destination address of the central office that has the associated I/P. Then, the originating central office routes the call to the end office with the associated I/P for processing the call. That end office polls the SCP for appropriate instructions to process the call. The SCP returns the call processing instructions to the requesting central office. Additional call processing instructions may be downloaded from the SCP to the I/P while the caller and I/P are interacting. Multiple queries to the SCP may not be necessary because all the information needed to process the call may have been retained in a single query. Also, during the call, the I/P may return to the SCP the results of caller interaction with the I/P.

The end office with the associated I/P, or the I/P 18, returns audible ringback to the caller. Audible ringback to the caller ceases and the caller receives service from the I/P 18. At this point, several scenarios of interaction between the caller responding to the ad and the I/P are possible:

A. The caller could be played a standard message by the I/P such as "I'm not available right now", "The car has been sold" or "The advertiser will be available after 8:30 p.m. today".

B. The caller responding to the ad may listen to a voice recording stored in the I/P that describes the item or service for sale. This description may be more exhaustive than that which appears in the ad.

C. If the advertiser is not available, the caller may leave a message.

D. The caller may be given a menu of options in which different choices are selected by depressing the appropriate Touch Tone inputs. For example, if a caller leaves a message, the caller may be given options for reviewing the message, erasing the message and rerecording a new message, or saving the message.

E. The I/P may have speech recognition capabilities to interact with the caller. The caller may be given a menu of options where different choices are selected by speaking the appropriate menu options.

F. If the subscriber reference number is not embedded in the published telephone number, the caller would be prompted to key in the appropriate subscriber reference number published in the ad. This number is passed to the SCP that is controlling the call. Options A through E may be employed after the caller keys in the appropriate SRN.

Following execution of these or other options, the next steps which occur depend on whether the call should be terminated or routed through to a subscriber. If the call is over, the I/P hangs up and the connection between the caller and the I/P ends. This is depicted in step 13'. Otherwise, if the call is to be routed through to a subscriber, steps 14 through 20 are executed. Note that step 14 would not occur if end office 908 were to hold the call. In addition, step 15 would be SCP 906 returning a destination address to end office three 908. Steps 15–20 are the same as steps 7–12 in FIG. 15. The SRN, whether embedded in the dialed telephone number or keyed into the I/P, is used as an index for the real telephone number of the advertiser.

When a subscriber wishes to change how calls are to be routed, he/she dials a special system access number that is routed to the intelligent peripheral. The steps to route this call are identical to steps 1–13' in FIG. 16, with the exception of step 13. Rather, the subscriber and I/P interact according to one of the following or other options:

A. The subscriber may be given a menu of options where different choices are selected by depressing the appropriate Touch Tone inputs. For example, if the advertiser leaves an announcement for callers to hear, the options of reviewing, erasing and rerecording the message may be made available.

B. The subscriber, once their product or service is sold, or is no longer available, may select the option of having callers routed to a message informing them that the item is no longer available.

C. The subscriber may select the option of having callers routed to a message informing them when to call back.

D. The subscriber may listen to messages left by the callers.

Figure 17:
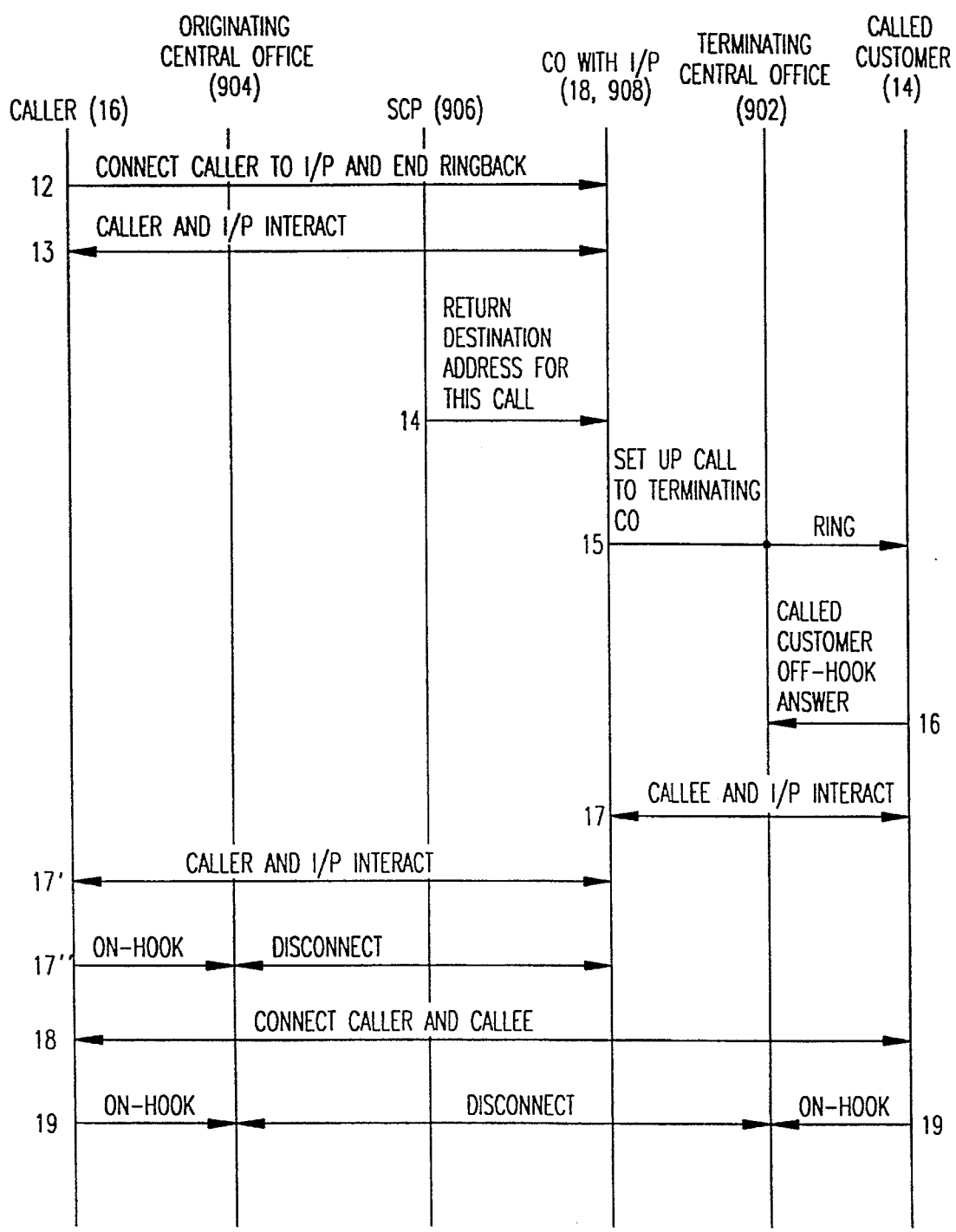

Two other services that utilize the concept of anonymous telephonic communication are a spoken caller ID service and a call screening service. FIG. 17 illustrates the steps occurring for the implementation of these services. Steps 1–12 are the same as those shown in FIG. 16. In step 13, the caller and system interact and the following are examples of the types of interaction:

A. The caller may be prompted to enter a short message identifying himself/herself.

B. The caller may be put on hold in the spoken caller ID service.

C. If the called party (callee) is not taking calls, the caller is prompted to leave a message.

Thereafter, the SCP returns the called party's real destination address to the central office with the associated I/P. The call is then set up to the terminating central office and the called party. The called party answers the ringing telephone. Next, the I/P plays an introductory message to the called party and then the short message left by the caller. In the spoken caller ID service, the I/P announces the caller's telephone number and may also include the caller's message. The called party then chooses to accept or reject the call by depressing a certain key to accept or another key to reject. In the event that the called party is not taking calls, the I/P requests that the caller leave a detailed message describing their reason for calling. Otherwise, the caller and the called party are connected to each other. After their conversation, the connection between the two switches is broken when either the caller or called party hangs up.

Figure 18:
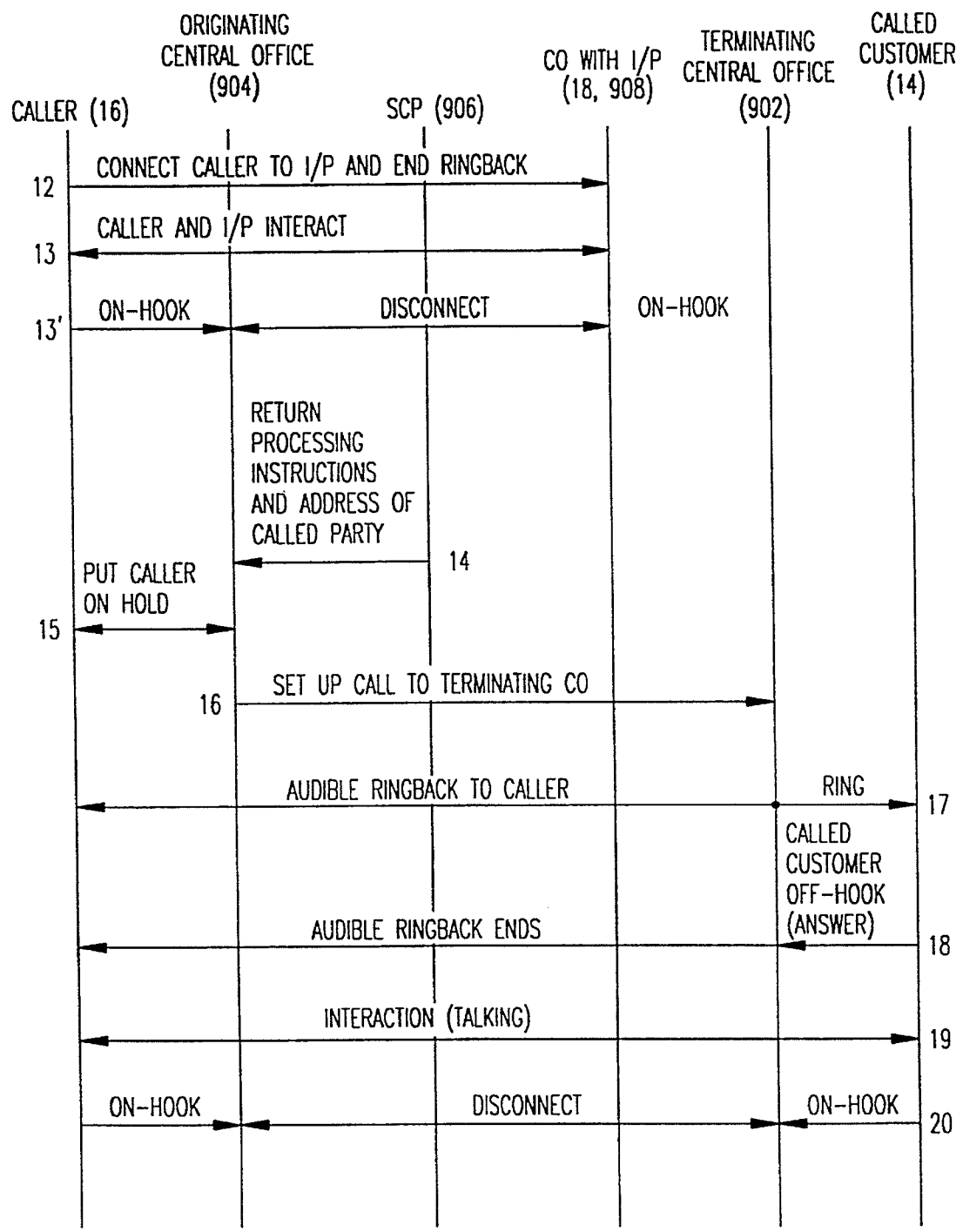

Yet another concept for anonymous telephone communication is personals. The steps depicted in FIG. 18 are those that would be implemented in a telephone network when a person responding to an ad telephones the number in the ad. Steps 1–12 and 16–20 are the same as those shown in FIG. 16. In step 13, the caller and advertiser interact according to one of the following options:

A. The caller is told that the call will cost a fixed amount of money, for example $4.00. If the caller decides to stay on the line and accept charges, then he/she is connected through to the advertiser.

B. If the advertiser is not taking calls, then the I/P plays a message to the caller who is then prompted to leave a message.

In accordance with a fifth embodiment of the present invention, a call screening system with an answering machine style interface is provided. Call screening is an important feature of a home answering machine. The called party with the answering machine often wishes to know who is calling before conversing with the caller. Answering machine capabilities are also provided in a network based voice mail system, in which persons subscribe to the voice mail system and retrieve all messages form the system. It is desireable to provide call screening methods for a network based voice mail system.

In accordance with this embodiment of the present invention, when a call is received by the call screening system (or voice mail system), that system would immediately telephone the subscriber's home telephone. When the subscriber answers the telephone, the subscriber would hear the, caller leaving the message, but the caller would not hear the subscriber. The subscriber could either hear the caller's message from the beginning, which is a delayed message, or actually hear the message in real time. If the subscriber wishes to converse with the caller, he/she would depress a key on the Touch Tone pad, for example, and the caller and subscriber would be connected. To not talk with the caller, the subscriber would merely hang up in which case the caller would continue to leave a message and then hang up.

Figure 19:
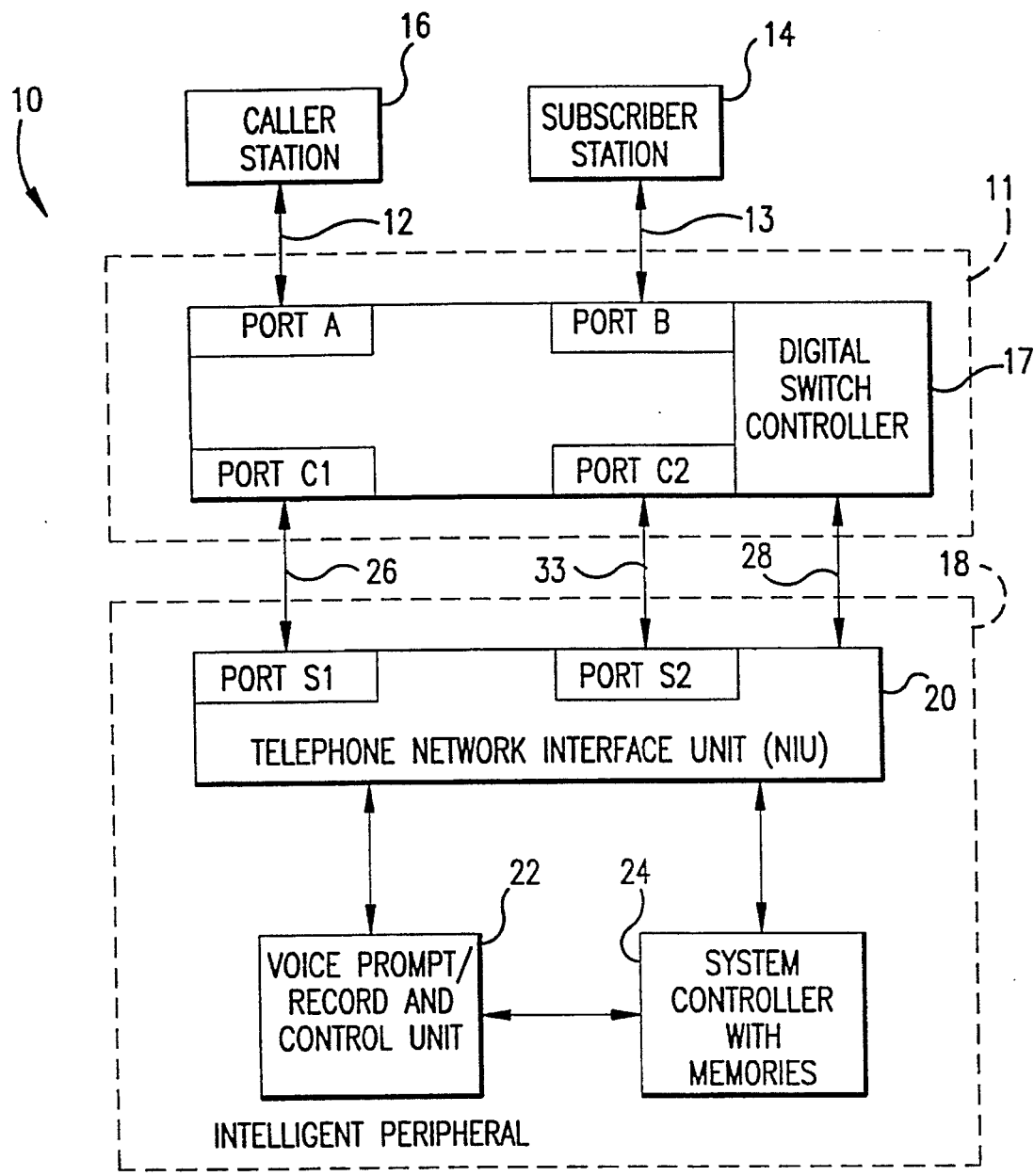
FIGS. 19–23 are block diagrams illustrating steps for performing call screening of a first method in a voice mail system in accordance with the fifth embodiment of the present invention.
Figure 20:
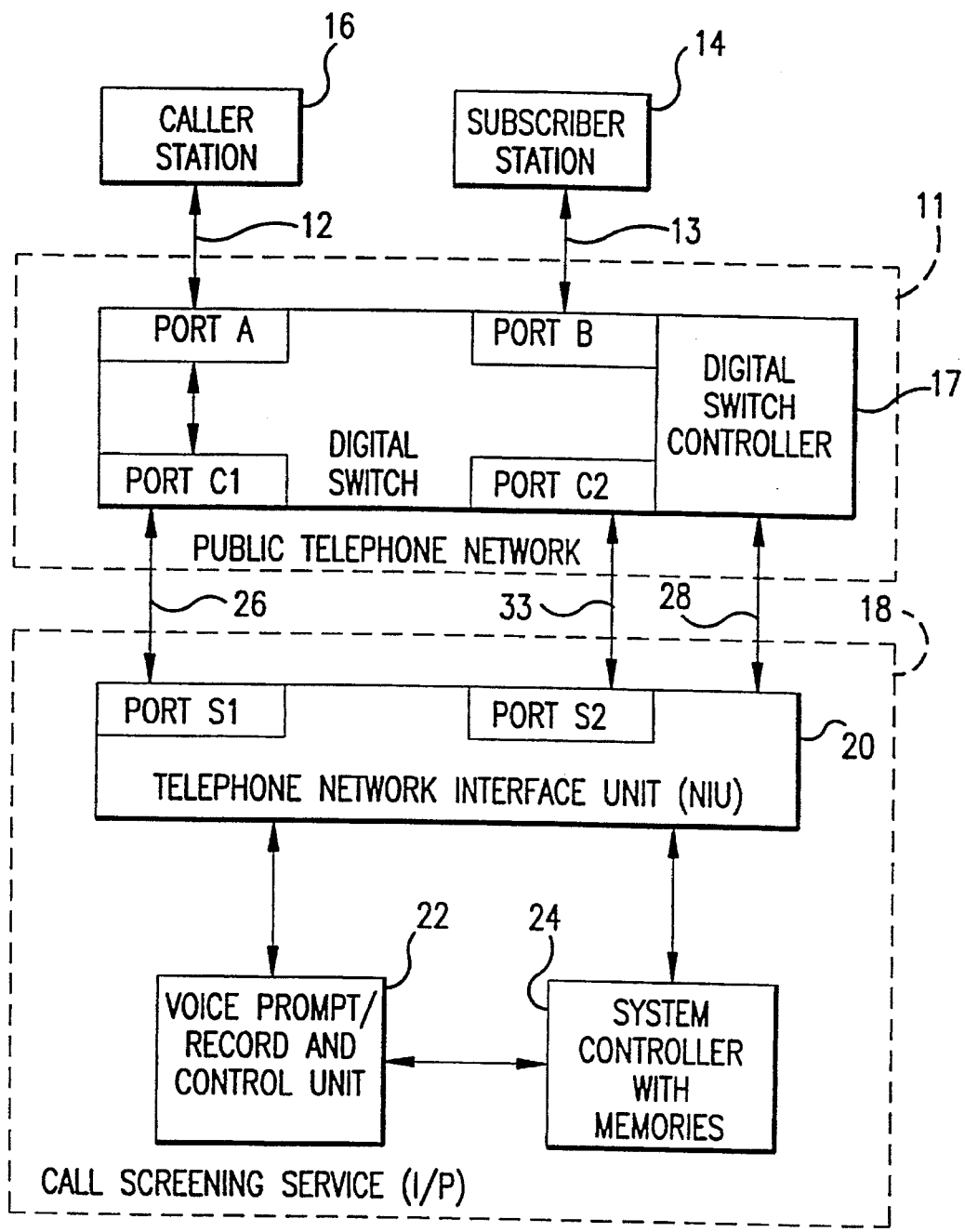
Figure 21:
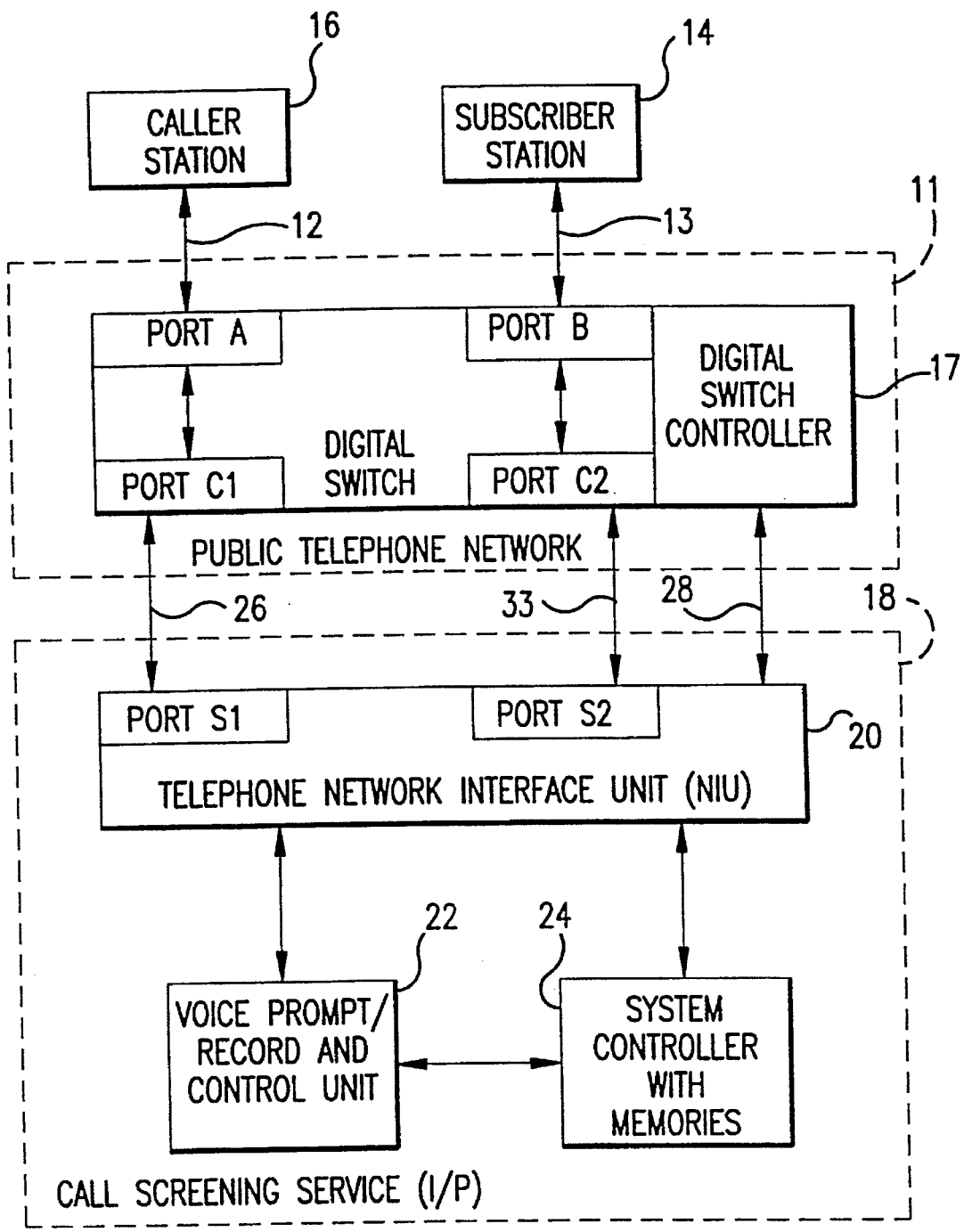
Figure 22:
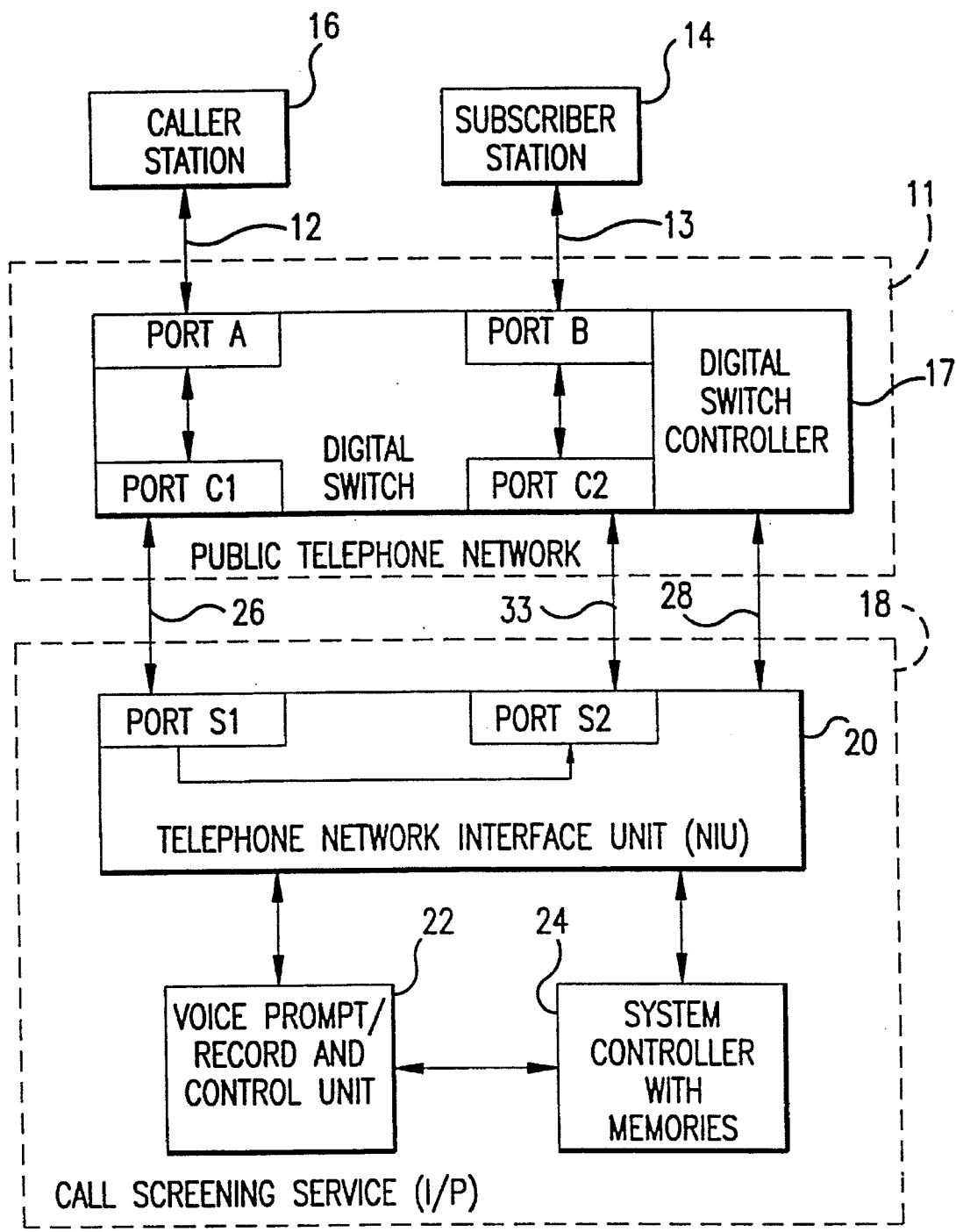
Figure 23:
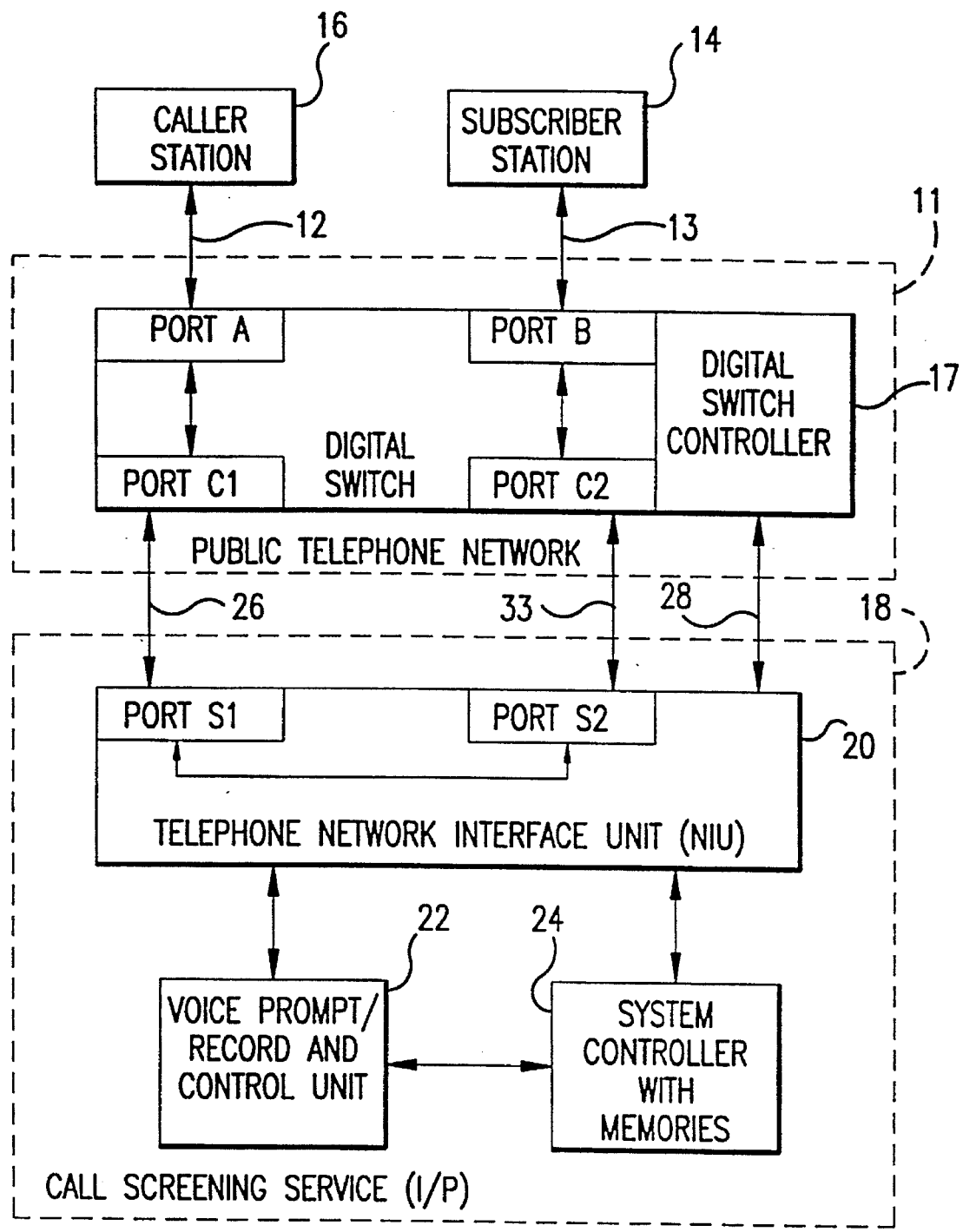

There are four methods in which the system described is implemented. FIG. 19 depicts one system for implementing the services described above. This is the same configuration as shown in FIG. 1 with the addition of trunk 33 connecting switch 17 and I/P 18. FIGS. 20–24 depict the steps that switch 17 and I/P 18 would go through to implement this kind of call. Referring to FIG. 20, the caller would reach the telephone network interface unit (NIU) 20 and voice prompt/record and control unit 22 via trunk 26. Control unit 22 would receive the call and start playing ringback to the caller. The system controller with memories 24 would then command the NIU 20 to call the subscriber using trunk 33, which is depicted in FIG. 21. The caller would hear an introductory prerecorded message from the subscriber asking them to leave a message. If the subscriber does not answer, the caller would just leave a message. If the subscriber answers, he/she would hear the caller leaving a message. The one way voice path from the caller to the subscriber is through the NIU 20, which is depicted in FIG. 22. NIU 20 allows the subscriber to hear the caller, but the caller does not hear the subscriber. If the subscriber decides to talk to the caller, he/she would depress the appropriate key on their touch tone phone or respond with a verbal command which I/P 18 would understand utilizing speech recognition techniques. The call would then be maintained by trunks 26 and 33 plus NIU 20 in I/P 18, which is depicted in FIG. 23.

Figure 24:
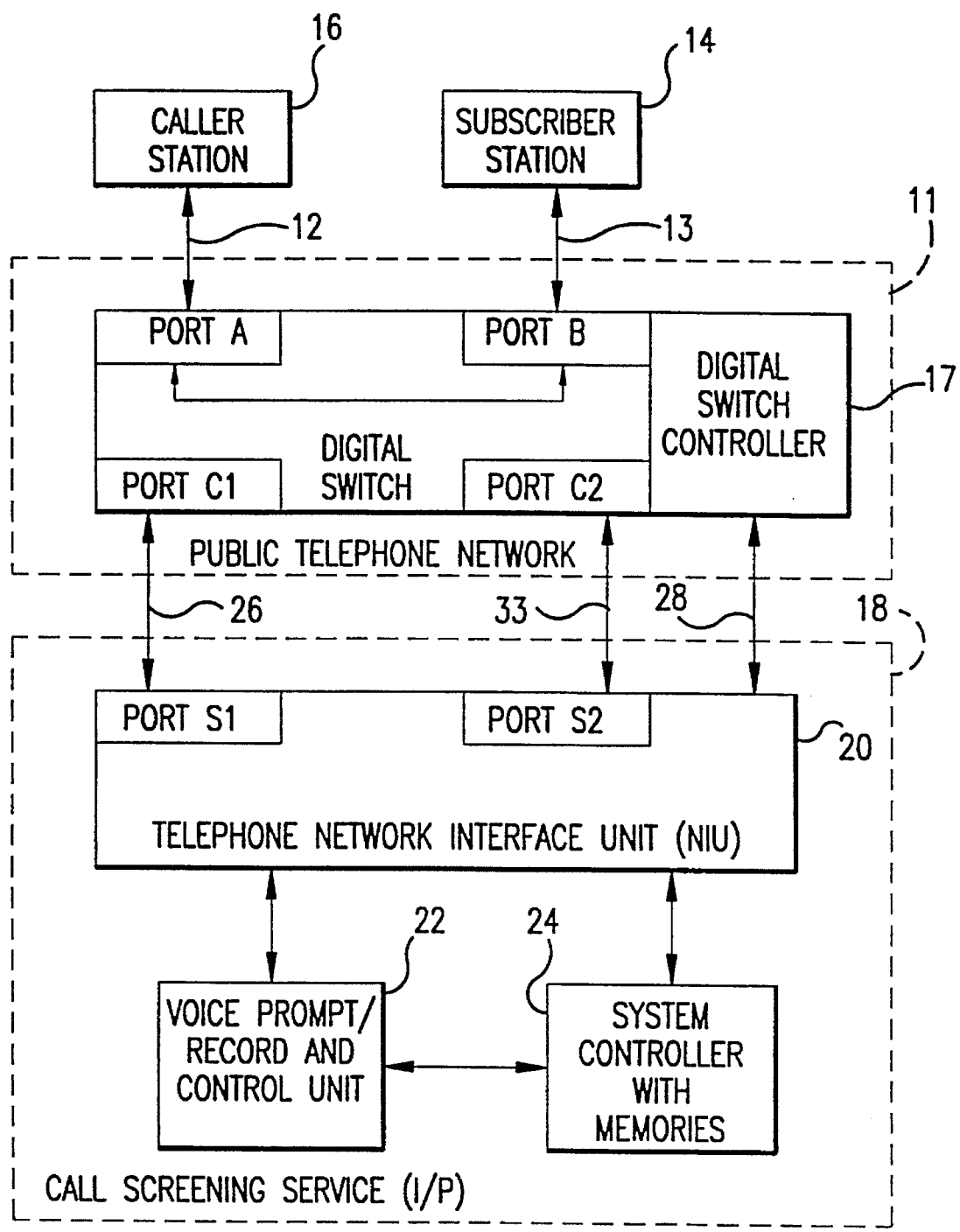
FIG. 24 is a block diagram illustrating a final step of a second method for performing call screening in a voice mail system in accordance with the fifth embodiment of the present invention.

In the second method of implementing the above service, the central office switch 17 would maintain the connection between the caller and the subscriber. FIG. 19, as above, is the basic system configuration. FIGS. 20–22 describe the basic setup of a call from a caller to a subscriber as described in the above paragraph. NIU 20 allows the subscriber to hear the caller leave a message, but does not allow the caller to hear the subscriber. If the subscriber decides to accept the call, control unit 22 via the telephone network interface unit 20 would signal the central office switch to hook ports A and B together. Unlike the embodiment described above, the call is not maintained by trunks 26, 33, and NIU 20 connecting switch 17 and I/P 18. Rather, the call is maintained by switch 17 as depicted in FIG. 24; trunks 26, 33 and NIU 20 are free to process the next call.

Figure 25:
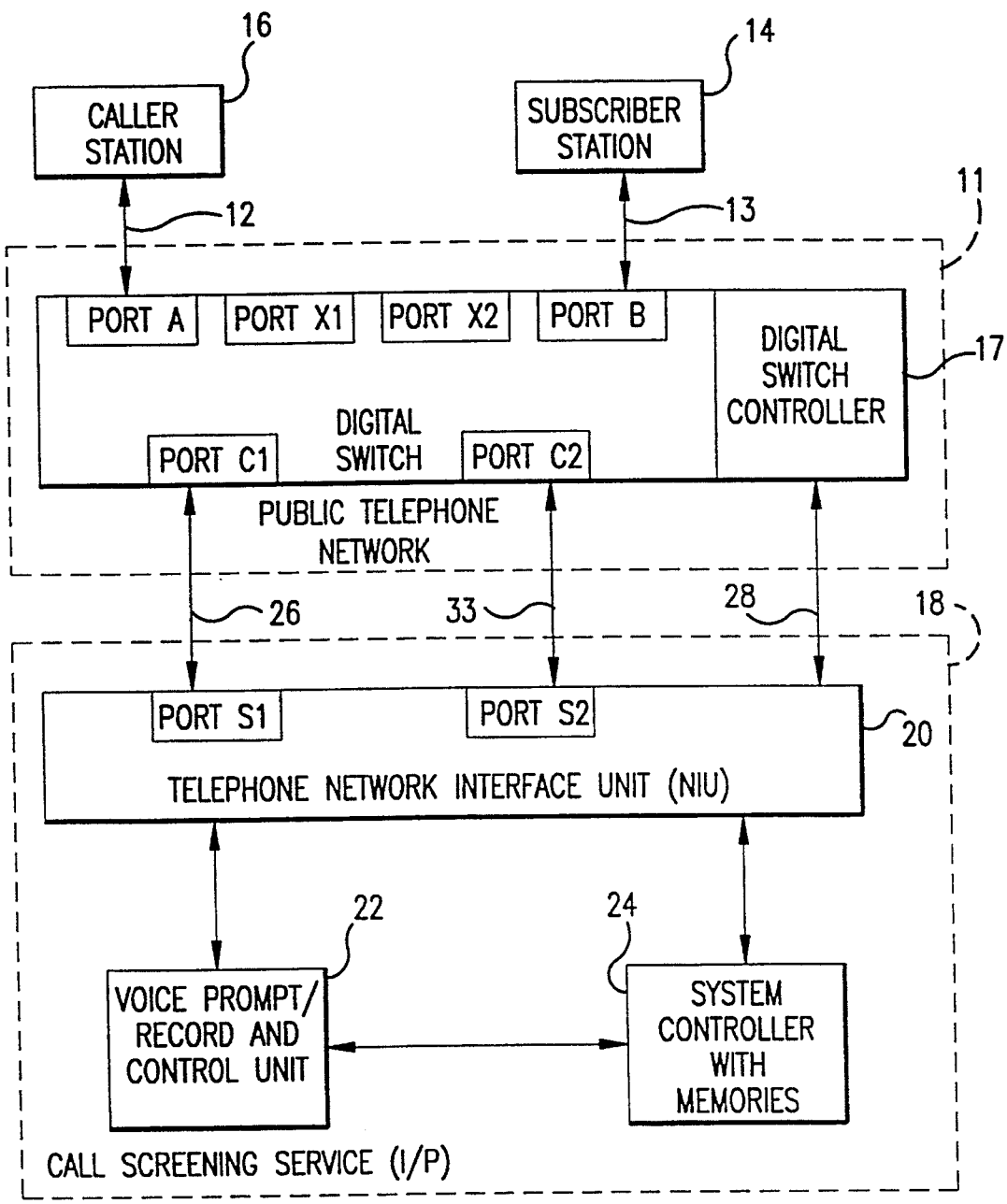
FIGS. 25–30 are block diagrams illustrating steps of a third method for performing call screening in a voice mail system in accordance with the fifth embodiment of the present invention.
Figure 26:
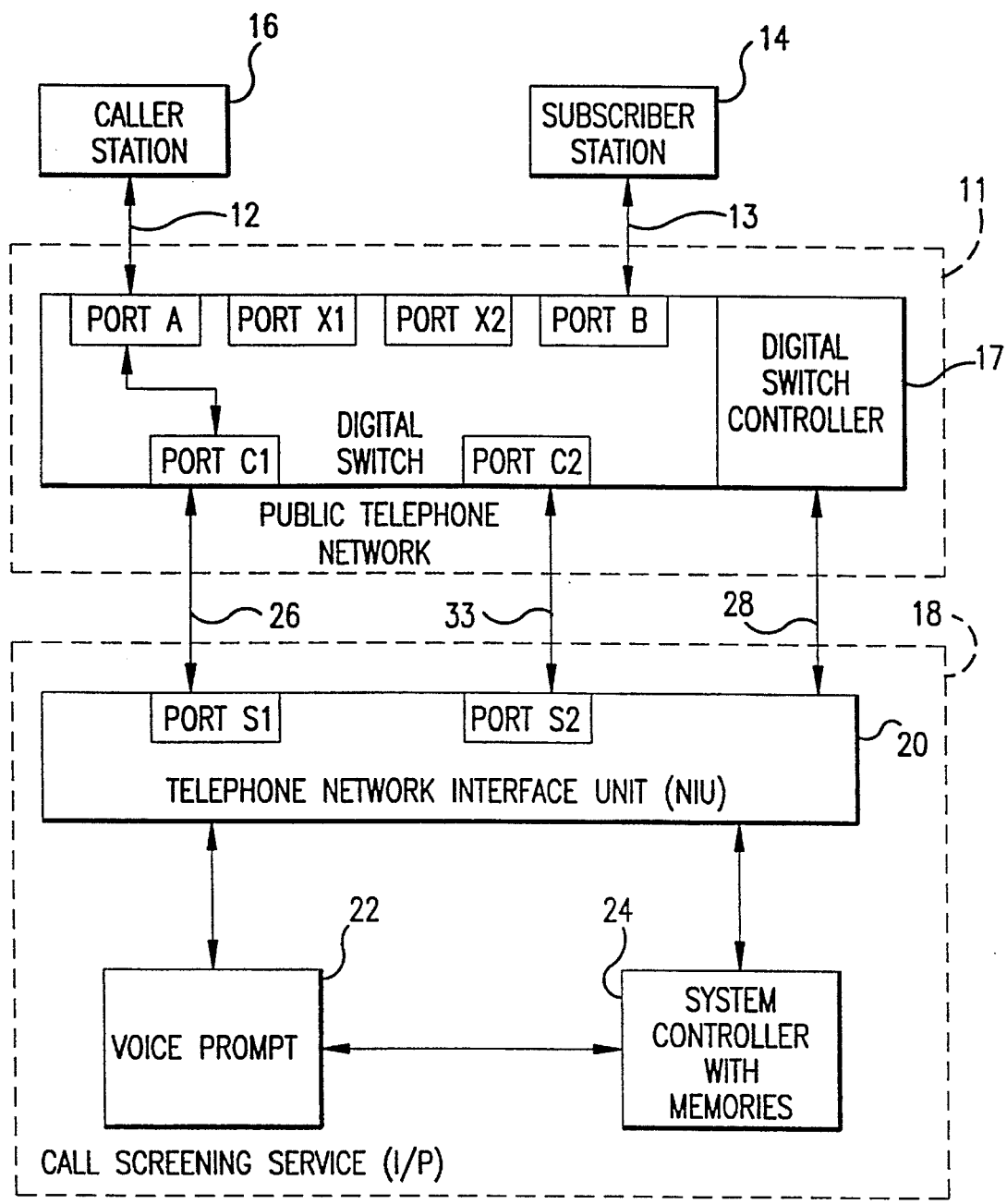
Figure 27:
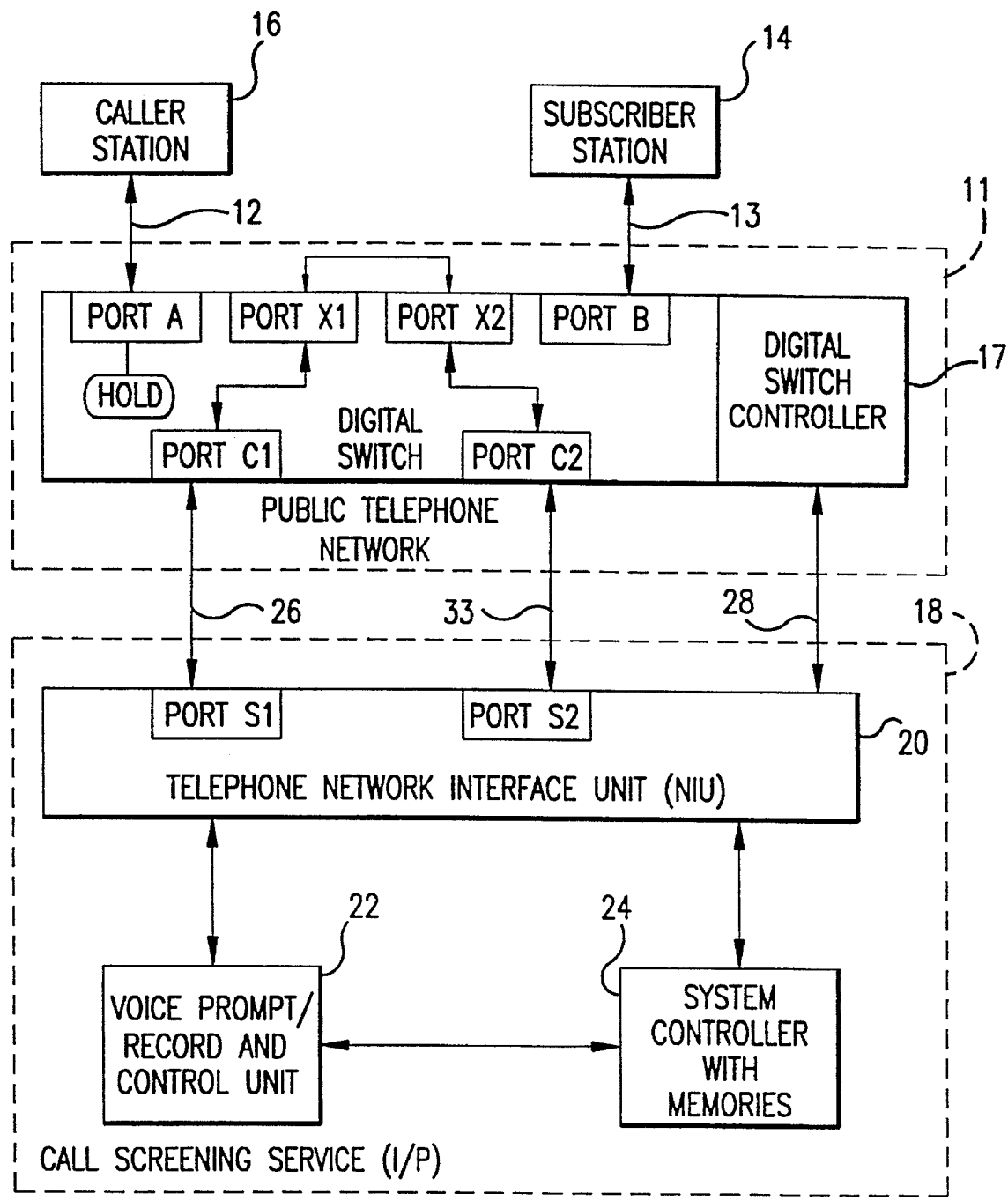
Figure 28:
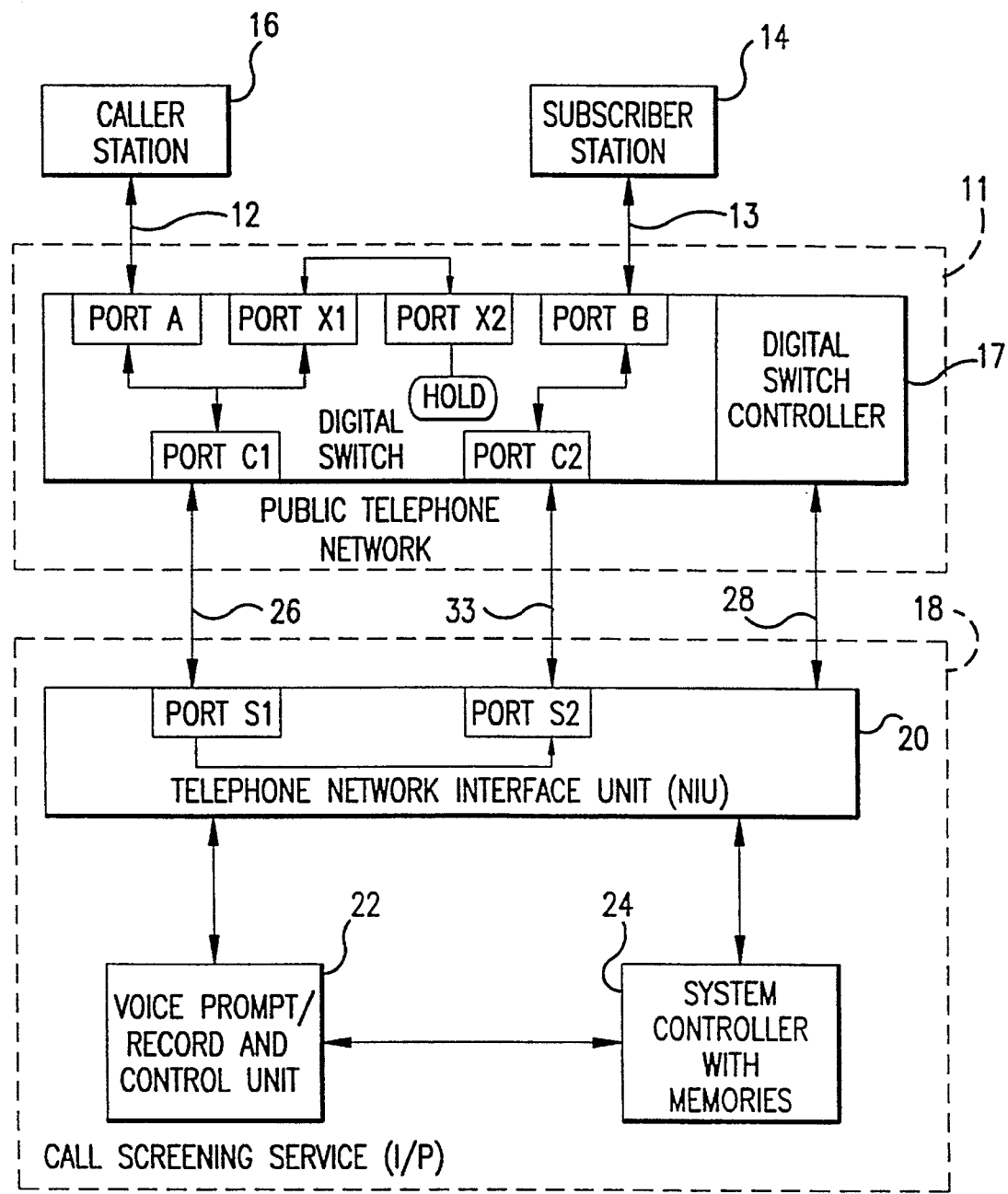
Figure 29:
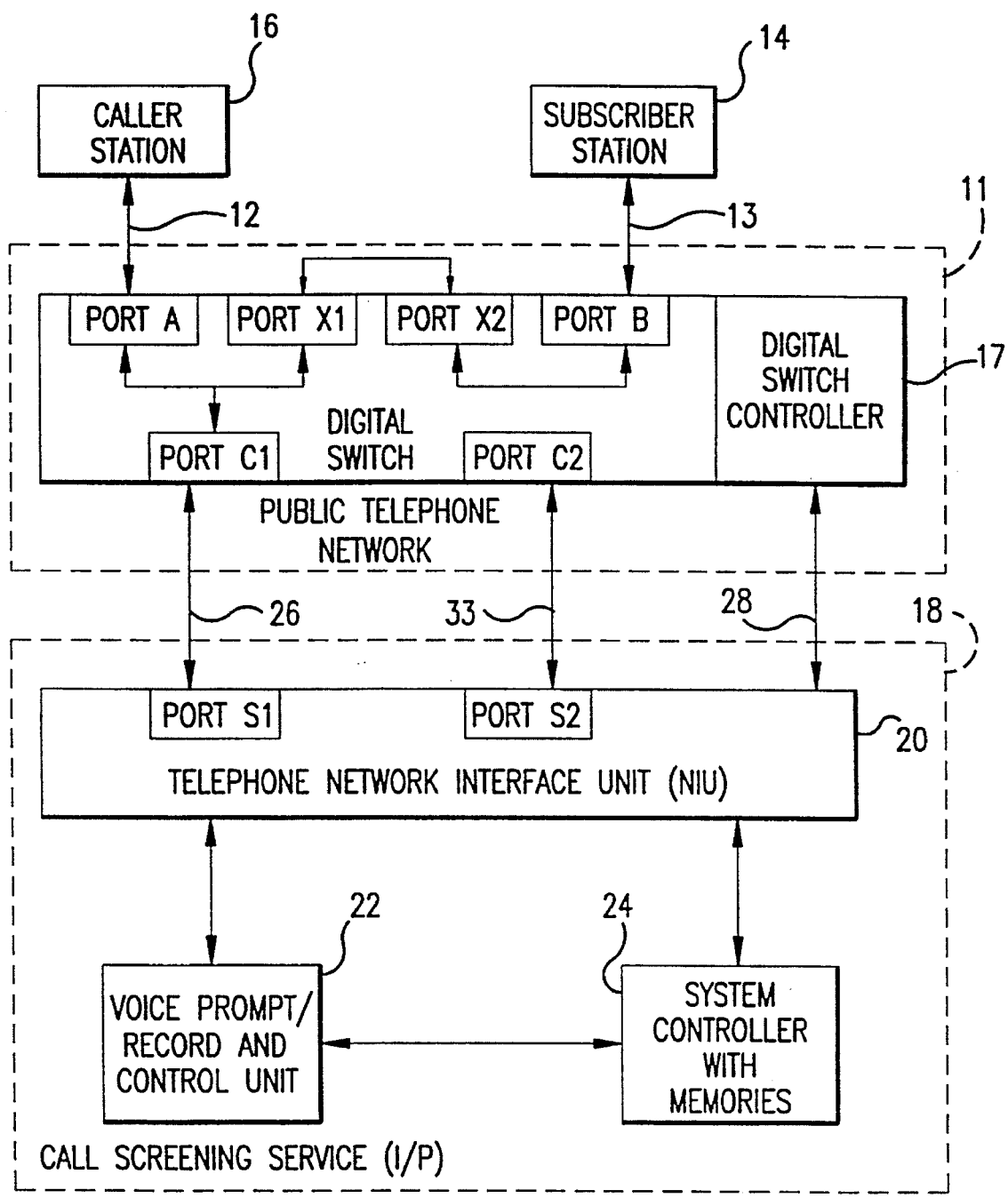
Figure 30:
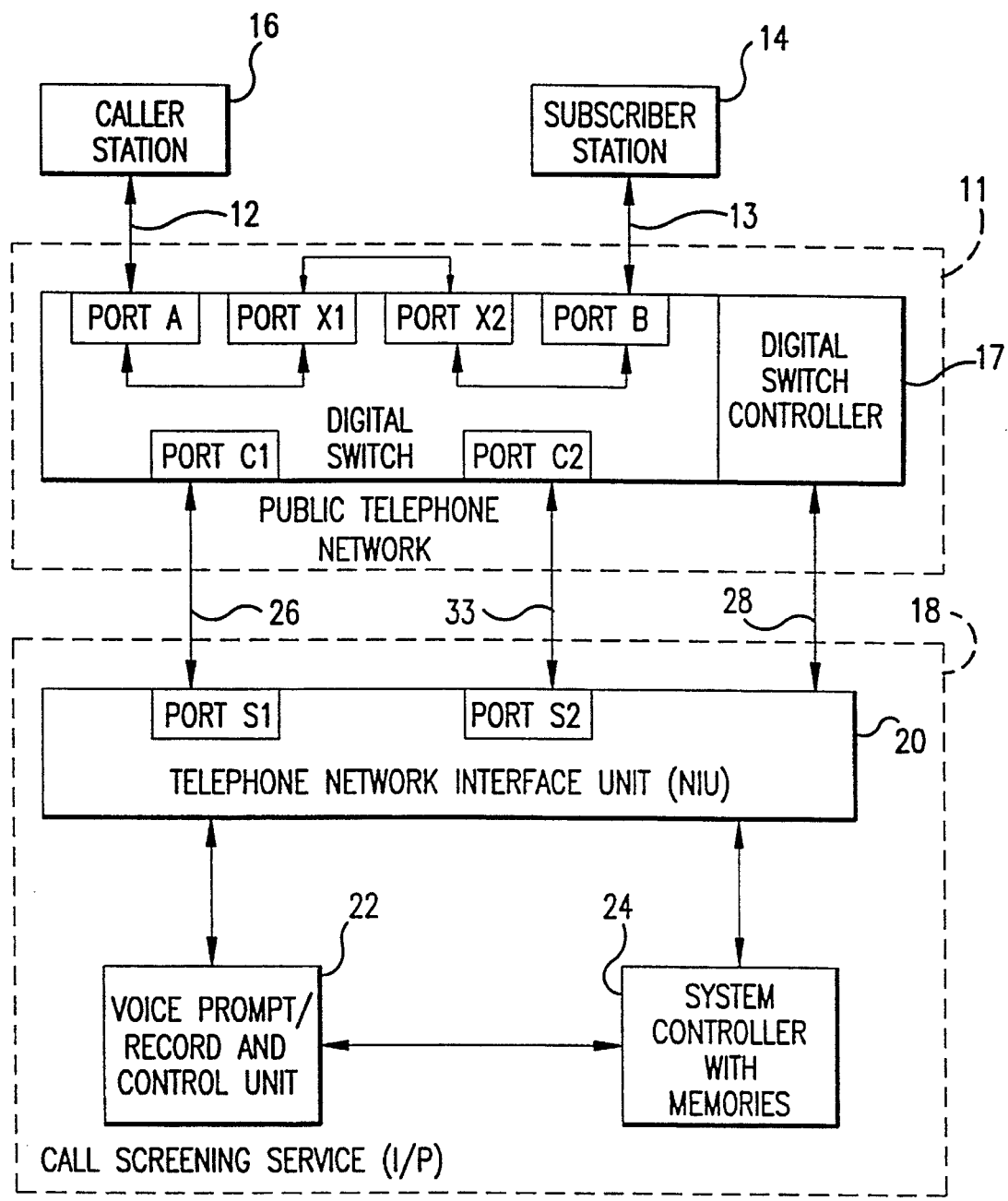

A third method for implementing the service described above uses two bi-directional trunks 26 and 33 depicted in FIG. 25 and the three-way conference capability of a central office switch. The difference between FIG. 25 and FIG. 19 is the dual three port conference capability depicted by the addition of ports X1 and X2. When a caller 16 reaches trunk 26 and the NIU 20, the caller is immediately played one ringback by the voice prompt/record and control unit 22, which is depicted in FIG. 26. The caller would then be put on hold by NIU 20. System 24 would instruct the NIU 20 to immediately dial a number that also belongs to I/P 18 and is another "Centrex" number utilizing trunk 26. These two steps are depicted in FIG. 27 by port A being placed on hold and port C1 connecting to port C2 through ports X1 and X2. This call would be answered over trunk 33 and then NIU 20 would hook flash trunk 33 to place this call on hold. NIU 20 would then hook flash trunk 26 and hence set up a three-way conference call between the caller, trunk 26 which is playing ringback, and trunk 33 through port X2 which is still on hold. This is depicted in FIG. 28. As soon as NIU 20 places the call from trunk 26 to 33 on hold, it would dial the subscriber's real telephone number on trunk 33. This is also depicted in FIG. 28 by the connection between ports C2 and B. After the subscriber answers, the voice path from the subscriber to the caller would be carried through NIU 20, which is depicted in FIG. 28. If the subscriber decides to take the call, NIU 20 would hook flash trunk 33 and then immediately hang up. This would connect the caller and subscriber together as shown in FIG. 29. Trunk 33 is now available for processing more calls. NIU 20 would then hang up on trunk 26 thus freeing this trunk to process more calls. This final state is depicted in FIG. 30 where switch 17 maintains the call. The caller and subscriber could then converse as long as they desire without utilizing any of the trunks associated with I/P 18.

Figure 31A:
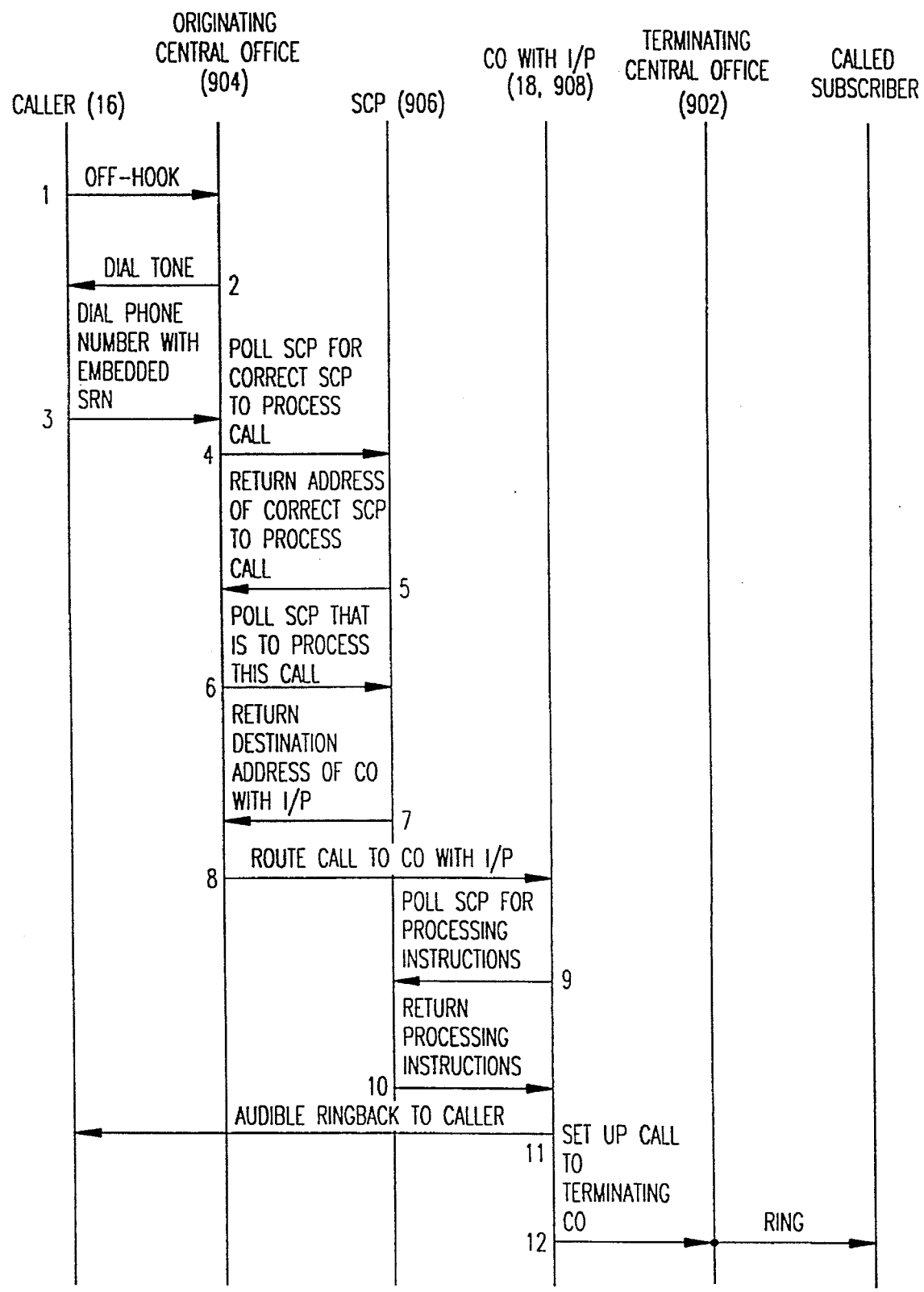
FIGS. 31A and 31B depict a fourth method for performing call screening in a voice mail system in accordance with the fifth embodiment of the present invention.
Figure 31B:
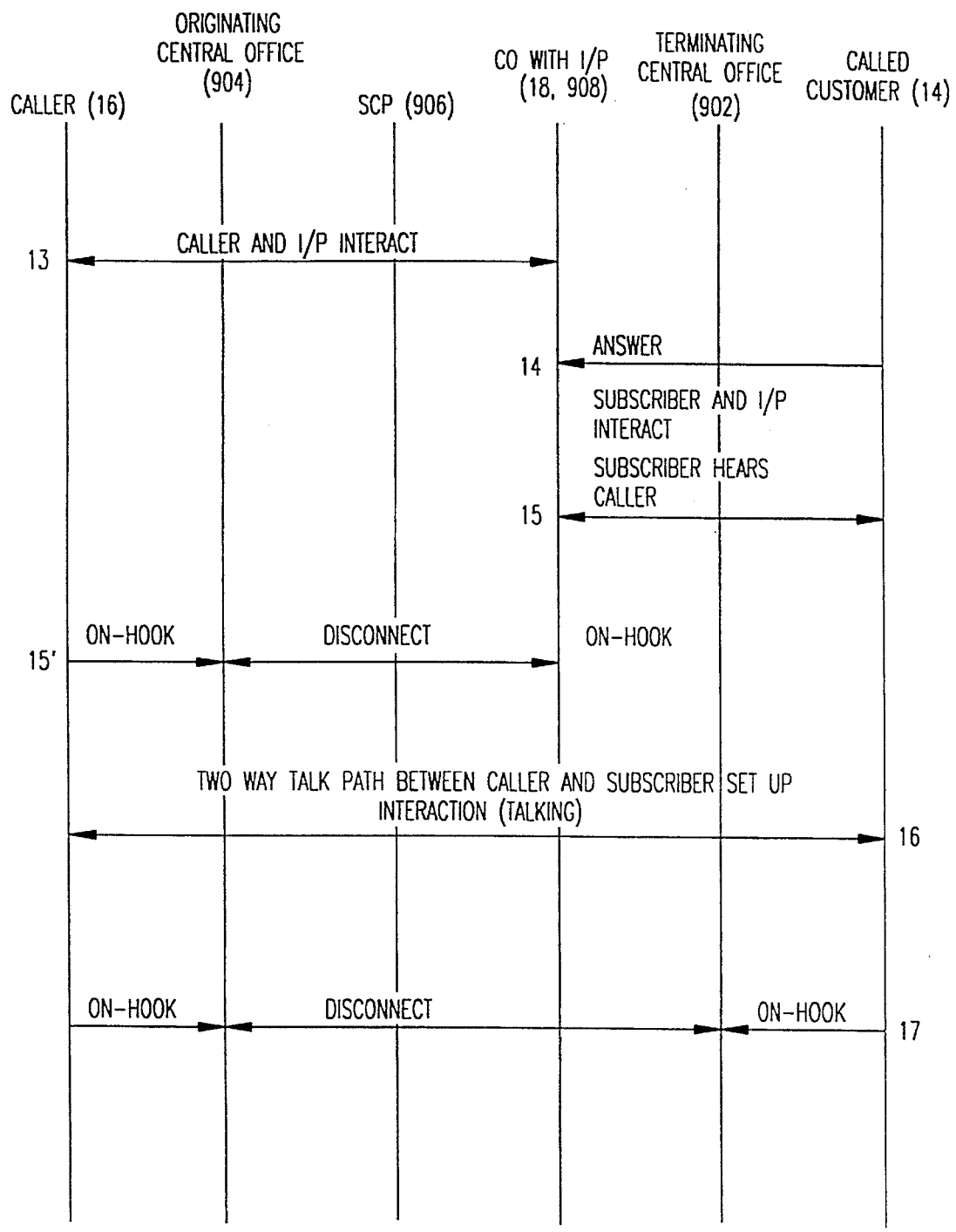

The fourth method for implementing the service described above uses common channel interoffice signalling (CCIS). FIGS. 31A and 31B depict the steps that would occur utilizing the network in FIG. 14. Steps 1–7 are similar to the preliminary steps to reach the I/P. In step 8, the call to the subscriber is sent to the end office 908 with associated I/P 18. While audible ringback is played to the caller, end office 908 sets up a call to the subscriber which is depicted in step 12. In step 13, the caller and I/P interact. Steps 14 and 15 depict the interaction between end office 908, I/P 18, and the subscriber. Note that steps 14 and 15 could actually occur at the same time as steps 11 and 13 so that the subscriber would hear as much of the caller's message as possible. In step 15, the subscriber hears the caller interacting with the I/P, but the caller does not hear the subscriber. If the subscriber does not answer or chooses not to accept the call, then step 15' would occur after the caller left a message. Steps 16 and 17 occur if the caller decides to accept the call.

Figure 32:
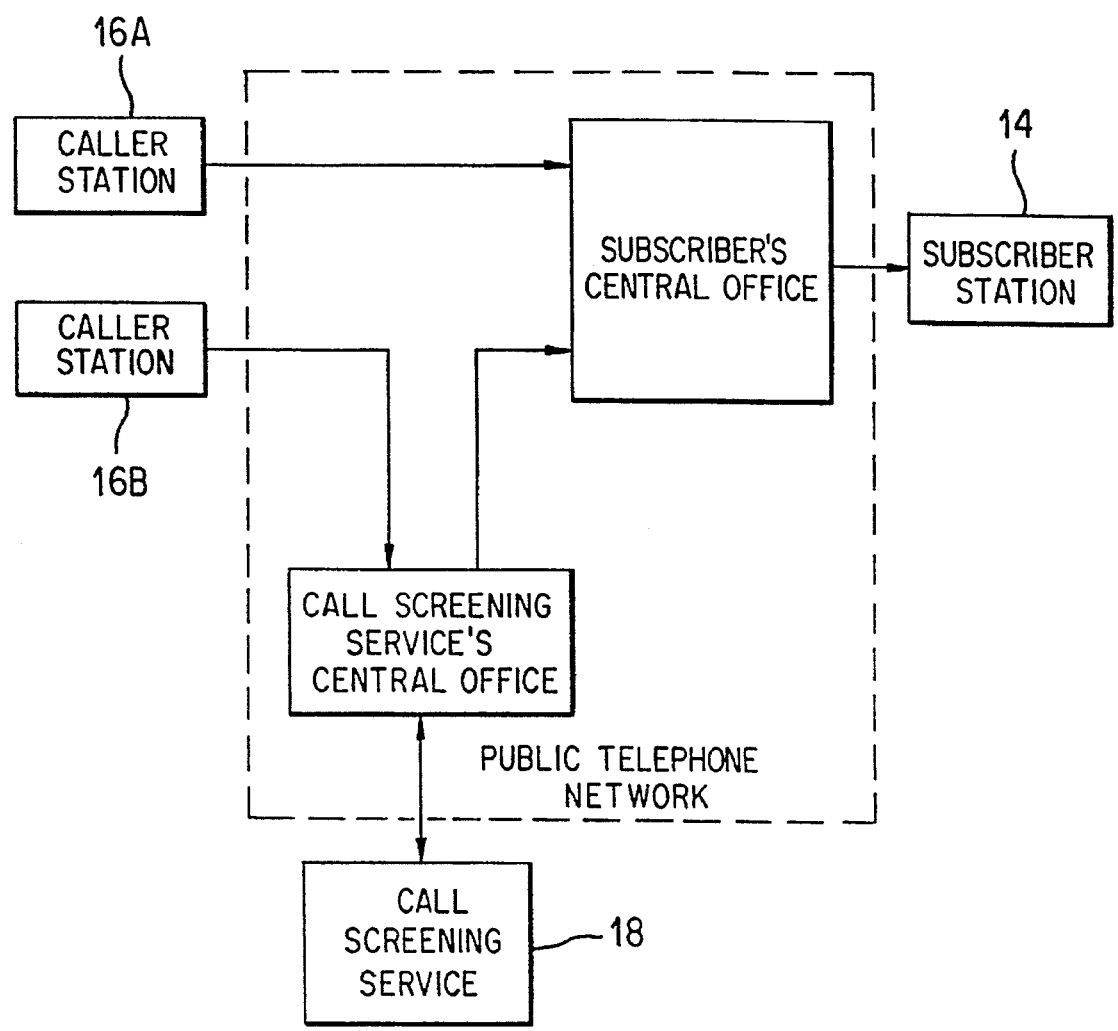
FIGS. 32 and 33 are block diagrams depicting intermediate and direct telephone number arrangements in accordance with the fifth embodiment of the present invention.

The four system configurations and methods described above for implementing call screening rely on the use of an intermediate telephone number. FIG. 32 represents a general intermediate telephone number model for the four systems and methods described above. A subscriber station 14 can be called directly by dialing the actual station address of station 14 which is a "private" number. This is represented in FIG. 32 where caller station 16A reaches the subscriber's central office directly by dialing the subscriber's "private" number. Other callers, such as a caller at caller station 16B, who do not know the subscriber station 14 "private" number would dial a station address associated with the call screening service which would then dial the subscriber's actual "private" number at station 14. The call would pass through the call screening service's central office. The published telephone number of the subscriber is received when dialed via known DID methods, and is indexed to the corresponding private telephone number.

Figure 33:
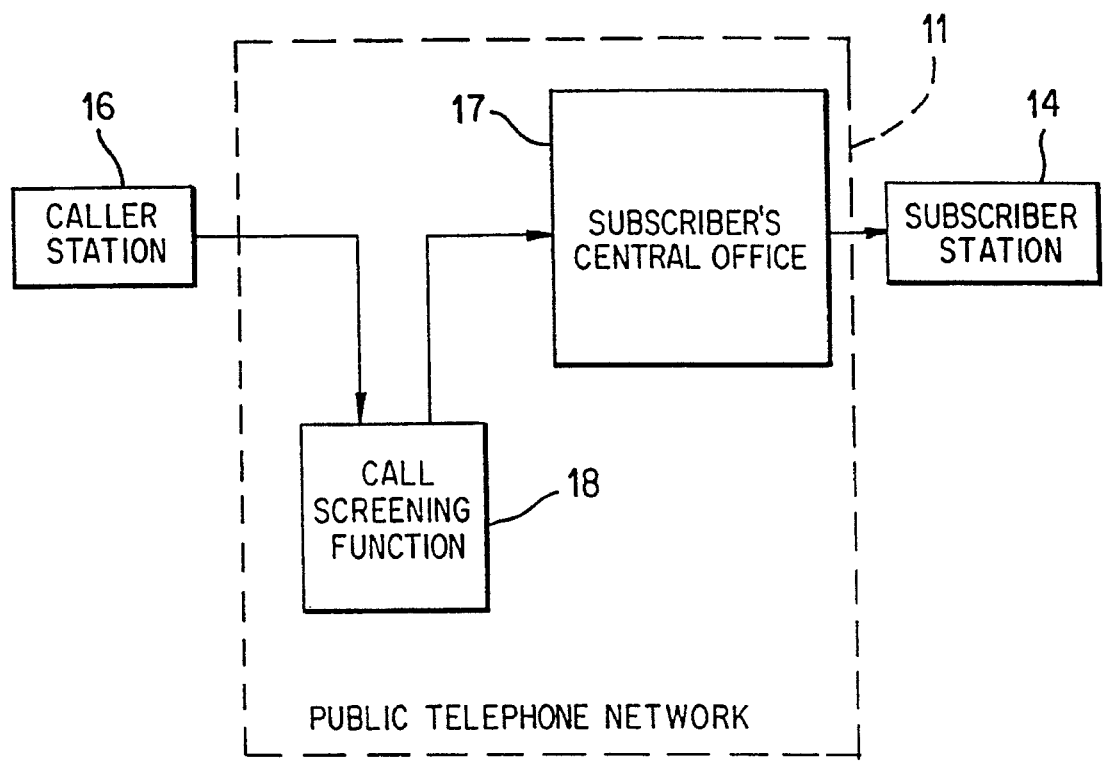

To avoid using two telephone numbers for each subscriber, the call screening function could be located within each subscriber's central office switch. This is depicted in FIG. 33. If any of the first three call screening methods described above are used, the (I/P) call screening service 18 would be implemented as an integral part of or associated directly with the subscriber's central office 17. The I/P 18 mentioned above would be integrated into the end office 17 associated with subscriber station 20. Thus, no caller station is able to call a subscriber directly, circumventing the call screening function. All calls will be screened. In the CCIS method of call screening, the call screening function 18 can be implemented using the same method and system described above under method four employing CCIS; all of the equipment is a part of the public telephone network. In connection with this modification, an existing private number of a subscriber may be made public and be intercepted by an end office switch at all times.

To implement the intermediate telephone number method of call screening with a subscriber who already has a telephone number requires rerouting calls to their old telephone number to the call screening service. One method of doing this is using a telephone company 5ESS feature called Local Area Signalling Services (LASS) Selective Call Acceptance (SCA). Using SCA, a subscriber would specify in an authorization list stored at a component of the local telephone network that only calls dialed from preselected telephone numbers would ring the subscriber's home telephone number directly. All other calls from parties not on the authorization list are programmed by the subscriber to be forwarded to the call screening service embodied by the I/P 18. Another way of rerouting calls to the subscriber's home telephone number is to have the subscriber disassociate their home telephone number from their home telephone and have all calls to the old number be forwarded to the call screening service. A method for doing this is to use a telephone company service called Remote Call Forwarding (RCF). All calls to the number that are set for RCF are forwarded to another telephone number. This latter method using RCF requires three telephone numbers.

Thus, there are several possibilities for reaching the call screening service. One is to have the subscriber keep his/her pre-existing private number and obtain a new public number which terminates at the call screening service, which service is programmed to know that calls to that new public number are for a particular subscriber (by DID capabilities, for example, and comparing the received DID number with numbers stored in memory indexed to the corresponding private numbers. A second is to make the pre-existing private number public, and program the local telephone company switch to forward calls to that number to the call screening service via remote call forwarding. In this case, the subscriber may obtain a new private number. A third is to keep the pre-existing private number and use remote call forwarding to forward all calls to the call screening service, or use selective call acceptance to forward only parties not on the authorization list to the call screening system, while parties on the authorization list may directly reach the subscriber.

The above description is intended by way of example only and is not intended to limit the present invention in any way except as set forth in the following claims.

We claim:

1. A call screening method for allowing subscriber to screen calls made to him/her from callers, the method comprising the steps of:

storing at a system controller station data that is received from a plurality of subscribers at a plurality of respective subscriber stations, such data including a private telephone number of each subscriber station;

providing a public telephone number for each of said subscriber stations, each of said public telephone numbers terminating at said system controller station;

indexing each public telephone number to its corresponding private telephone number in said system controller station;

receiving a call at said system controller station from a caller who dials a particular public telephone number for a particular subscriber;

identifying the particular public telephone number for the particular subscriber;

retrieving the private telephone number of the particular subscriber on the basis of the particular public telephone number;

placing a second call to the particular subscriber by dialing the particular subscriber private telephone number;

playing an introductory message to the caller in communication with said system controller station and prompting the caller to record a message identifying the caller;

if the particular subscriber picks up the second call, playing the caller's message so that the particular subscriber may hear the caller's message but the caller does not hear or know that the particular subscriber is hearing the message; and connecting the caller and the particular subscriber for full two-way communication upon the authorization of the particular subscriber.

\* \* \* \* \*